(12) United States Patent
Wolcott et al.

(10) Patent No.: US 12,192,852 B2
(45) Date of Patent: *Jan. 7, 2025

(54) METHODS, SYSTEMS, AND APPARATUSES FOR PRESENCE DETECTION

(71) Applicant: Comcast Cable Communications, LLC, Philadelphia, PA (US)

(72) Inventors: Larry Wolcott, Denver, CO (US); Zane Vella, Philadelphia, PA (US); Ken Klaer, Denver, CO (US); Andrew Frederick, Golden, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,389

(22) Filed: Jul. 28, 2023

(65) Prior Publication Data

US 2023/0370816 A1    Nov. 16, 2023

Related U.S. Application Data

(63) Continuation of application No. 16/805,288, filed on Feb. 28, 2020, now Pat. No. 11,758,360.

(51) Int. Cl.
*H04W 24/00* (2009.01)
*H04H 20/31* (2008.01)
*H04L 9/40* (2022.01)
*H04L 67/51* (2022.01)
*H04W 4/029* (2018.01)

(52) U.S. Cl.
CPC ............ *H04W 4/029* (2018.02); *H04H 20/31* (2013.01); *H04L 63/102* (2013.01); *H04L 67/51* (2022.05)

(58) Field of Classification Search
CPC ...... H04W 4/029; H04L 63/102; H04L 67/16; H04H 20/31
USPC ........................................................ 455/456.1
See application file for complete search history.

(56) References Cited

U.S. PATENT DOCUMENTS

| | | | |
|---|---|---|---|
| 8,661,151 B2* | 2/2014 | Sharkey | H04N 21/4788 709/231 |
| 9,100,772 B2* | 8/2015 | Jantunen | G06F 3/1446 |
| 9,143,881 B2* | 9/2015 | Fan | G06Q 20/3224 |
| 9,288,254 B2* | 3/2016 | Sharkey | H04M 1/72442 |
| 9,408,011 B2* | 8/2016 | Kim | H04R 1/323 |
| 9,701,244 B2* | 7/2017 | Payne | B60W 50/14 |
| 9,769,624 B1* | 9/2017 | Aharony | H04L 67/10 |

(Continued)

OTHER PUBLICATIONS

Daniel Arp et al. "Bat in the Mobile: a Study on Ultrasonic Device Tracking", Computer Science Report No. 2016-02, Technische Universitat Braunschweig, Institute of System Security (2016)(32 pages).

(Continued)

*Primary Examiner* — Amancio Gonzalez
(74) *Attorney, Agent, or Firm* — Ballard Spahr LLP

(57) ABSTRACT

Methods, systems, and apparatuses for presence detection are described herein. A first computing device may emit an inaudible audio signal. A second computing device may detect the inaudible audio signal. The second computing device may send an indication of detecting the inaudible audio signal. The first computing device may cause presentation of content to be modified based on the indication sent by the second computing device and a user profile associated with a user of the second computing device.

28 Claims, 12 Drawing Sheets

(56) References Cited

U.S. PATENT DOCUMENTS

| | | |
|---|---|---|
| 9,886,696 B2 | 2/2018 | Roeding et al. |
| 10,034,098 B2* | 7/2018 | Kupershmidt ........ B81B 3/0021 |
| 10,044,448 B2 | 8/2018 | Mufti |
| 10,078,135 B1* | 9/2018 | Almada ................ G01S 5/30 |
| 10,129,912 B2* | 11/2018 | Tinnakornsrisuphap ................... H04W 76/10 |
| 10,254,383 B2* | 4/2019 | Bradley ................ G01S 5/18 |
| 10,267,868 B1* | 4/2019 | Latone ............... G01R 33/0023 |
| 10,310,079 B1* | 6/2019 | Um ........................ G01S 15/04 |
| 10,320,860 B1* | 6/2019 | Bunner ................ H04W 4/023 |
| 10,547,936 B2* | 1/2020 | Nagel ................... H04R 1/028 |
| 10,559,309 B2 | 2/2020 | Carbune et al. |
| 10,580,066 B1* | 3/2020 | Hazlewood ........ G06Q 30/0635 |
| 10,616,767 B2* | 4/2020 | O'Gorman .............. H04L 67/04 |
| 10,795,018 B1* | 10/2020 | Koteshwara ........... H04R 1/406 |
| 10,820,056 B2* | 10/2020 | Wittke ............... H04N 21/8456 |
| 10,824,389 B2* | 11/2020 | Okada .................. H04R 1/1041 |
| 10,958,467 B2* | 3/2021 | Mackay ................ H04L 67/51 |
| 11,758,360 B2* | 9/2023 | Wolcott ................ H04H 20/31 455/456.1 |
| 2009/0312849 A1* | 12/2009 | Cosgrove ............... H04S 7/303 345/207 |
| 2014/0051408 A1* | 2/2014 | Jenzowsky ...... H04N 21/41265 455/414.1 |
| 2014/0323162 A1* | 10/2014 | Ezra ....................... G01C 21/20 455/457 |
| 2015/0294539 A1* | 10/2015 | Van Buyten ............ H04W 4/20 340/384.1 |
| 2016/0240186 A1* | 8/2016 | Leabman .................. H02J 7/02 |
| 2016/0355292 A1* | 12/2016 | Wigdahl ............. A01F 15/0715 |
| 2017/0006351 A1* | 1/2017 | Haberman ......... H04N 21/4854 |
| 2017/0300186 A1* | 10/2017 | Kuhar .................. G06F 3/0482 |
| 2018/0032997 A1* | 2/2018 | Gordon ............. G06Q 30/0269 |
| 2018/0316507 A1* | 11/2018 | Smith .................. H04L 9/3247 |
| 2019/0371028 A1* | 12/2019 | Harrises ................ G06T 11/60 |
| 2020/0364324 A1* | 11/2020 | Ganeshmani ........... G06F 21/62 |
| 2021/0006916 A1* | 1/2021 | Reimann ................ H03G 5/165 |
| 2021/0208841 A1* | 7/2021 | Wilberding ............ G10L 25/51 |

OTHER PUBLICATIONS

U.S. Appl. No. 16/805,288 (U.S. Pat. No. 2021/0274312), filed Feb. 28, 2020 Sep. 2, 2021, Larry Wolcott (Comcast Cable Communications, LLC).

* cited by examiner

METHODS, SYSTEMS, AND APPARATUSES FOR PRESENCE DETECTION

CROSS REFERENCE TO RELATED PATENT APPLICATIONS

This application claims priority under 35 U.S.C. § 120 to, and is a continuation of, U.S. patent application Ser. No. 16/805,288, filed Feb. 28, 2020, the entire contents of which is hereby incorporated herein by reference in its entirety for all purposes.

BACKGROUND

Methods, systems, and apparatuses for presence detection are described herein. A range of technologies and methods exist for detecting the presence of a person or object in an area of interest. Examples of such technologies include Wi-Fi and Bluetooth™ polling at an access point(s). These existing technologies and methods lack the ability to determine precise locations of persons or objects, and their accuracy may be substantially affected by radio frequency propagation issues and/or handoffs between access points. These and other considerations are addressed herein.

SUMMARY

It is to be understood that both the following general description and the following detailed description are exemplary and explanatory only and are not restrictive. Methods, systems, and apparatuses for presence detection are described herein. A first computing device may be assigned a first identifier by a control device. The control device may associate, or map, the first identifier of the first computing device with a geographic location and a date and/or a time at which the identifier was assigned. The first computing device may utilize ultrasonic signaling techniques to transmit information. For example, the first computing device may transmit information indicating the first identifier by emitting an ultrasonic audio signal. The ultrasonic audio signal may be emitted by the first computing device during presentation of content, such as a show, a movie, etc. and/or while content is not being presented.

A second computing device may be proximate to the first computing device while the ultrasonic audio signal is being emitted by the first computing device. The second computing device may use a microphone, or similar component, to detect soundwaves of the ultrasonic audio signal. The second computing device may use the detected soundwaves of the ultrasonic audio stream to determine the first identifier by decoding the ultrasonic audio signal. The second computing device may send the first identifier to the control device and the control device may associate, or map, a second identifier associated with the second computing device with a date and/or a time as well as with the geographic location. The control device may indicate to the first computing device that the second computing device is currently located at the geographic location. The first computing device may cause presentation of content to be modified based on the indication received from the control device and a user profile associated with the second computing device. For example, the first computing device may cause a level of volume to change, one or more lights to dim, closed-captioning to be displayed, etc., based on the user profile.

In another example, the second computing device may receive/detect the ultrasonic audio signal emitted by the first computing device. The second computing device may send an indication to the first computing device that the second computing device received/detected the ultrasonic audio signal. The first computing device may receive the indication via the second computing device. The first computing device may cause presentation of content to be modified based on the indication received from the second computing device and the user profile associated with the second computing device.

The ultrasonic signaling techniques utilized by the first computing device may assist emergency services with locating a user of the second computing device. For example, an emergency network server may send a location request to the control device. The location request may include the second identifier (e.g., associated with the second computing device). The control device may send a response to the location request to the emergency network server indicating the geographic location and the date and/or time to which the control device associated, or mapped, the second identifier. In this way, emergency services may be notified of the second computing device's location, which may assist in locating the user of the second computing device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
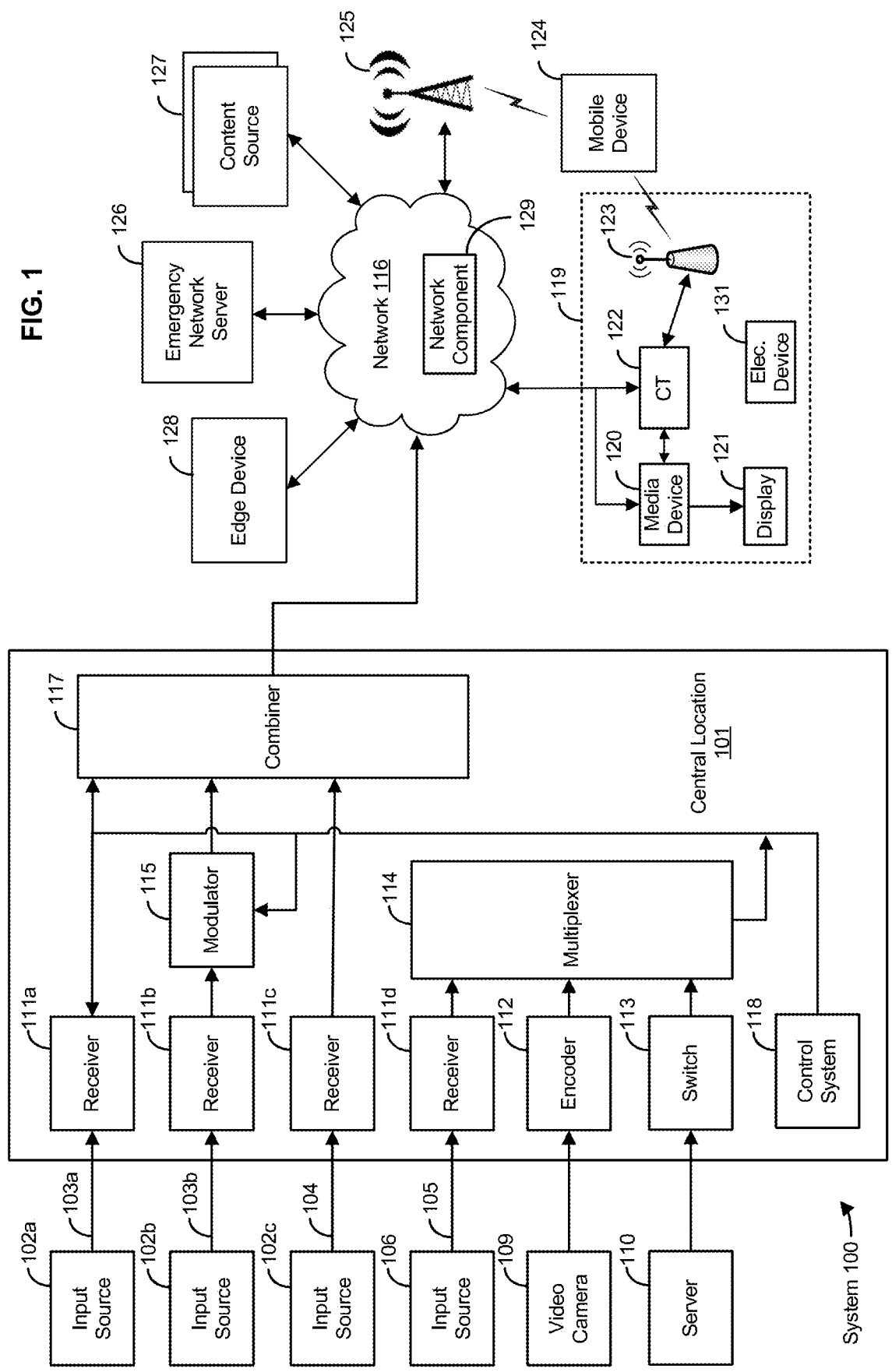
FIG. 1 shows an example system for delivering content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, 8k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats. This detailed description may refer to a given entity performing some action. It should be understood that this language may in some cases mean that a system (e.g., a computer) owned and/or controlled by the given entity is actually performing the action.

Described herein are methods, systems, and apparatuses for presence detection. A first computing device, such as a set-top box, a smart speaker, an entertainment system controller, a television, a smartphone, a tablet, or any other suitable device, may use ultrasonic and/or near-ultrasonic communication to determine a presence of a person or object proximate to the first computing device, such as a person or object in a same room of the first computing device (e.g., 0-20 feet apart). The first computing device may be assigned a first identifier by a control device, such as a cache device or a headend of a content distribution network. For example, the first computing device may execute an initialization process, such as a startup procedure(s) executed during a booting phase of the first computing device, and during the initialization process the first computing device may receive the first identifier from the control device. The first identifier may be a media access control ("MAC") address associated with the first computing device. The control device may associate, or map, the first identifier with a subscriber profile associated with the first identifier. The subscriber profile may include a location identifier indicating a geographic location. The geographic location may be a physical address (e.g., number, street, city, state, and country) at which the first computing device is located, a location within a structure/building, an area of interest, a combination thereof and/or the like. The control device may associate, or map, the first identifier with a date and/or a time, such as a date and/or time at which the control device assigned the first identifier to the first computing device.

The first computing device may utilize sonic signaling, such as ultrasonic and/or near-ultrasonic communication techniques, to transmit information or detect presence of another device. For example, the first computing device may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device may emit the audio signal—or a portion thereof representing the encoded first identifier—at or above 20,000 Hz such that it may be inaudible to persons nearby the first computing device.

As a further example, the first computing device may use a microphone or other sound-receiving device to detect an audio sample of soundwaves within the proximity of the first computing device. From the audio sample, the first computing device may ascertain one or more frequencies of an acoustic spectrum on which the first computing device does not detect any sound (hereinafter, "one or more vacant frequencies"). The one or more vacant frequencies may include one or more ultrasonic and/or near-ultrasonic frequencies at or above 20,000 Hz. The first computing device may use the one or more vacant frequencies to transmit information. For example, the first computing device may use the one or more vacant frequencies to encode the first identifier into an inaudible portion of an audio signal using one or more a dual-tone multi-frequency signaling process, a discrete Fourier transform, a combination thereof, and/or the like. The inaudible portion of the audio signal may be an ultrasonic and/or near-ultrasonic signal. One or more frequencies of the inaudible portion of the audio signal may correspond to the one or more vacant frequencies (e.g., frequencies at or above 20,000 Hz). The audio signal may be associated with content that is being presented such as a movie, a show, a commercial, a combination thereof, and/or the like. The first computing device may emit the audio signal—including the inaudible portion containing the encoded first identifier—during presentation of content (e.g., the inaudible portion may be emitted by the first computing device simultaneously with an audio signal of a content item). Additionally, or in the alternative, the first computing device may emit the inaudible portion containing the encoded first identifier when content is not being presented. For example, the first computing device may emit an audio signal containing only the inaudible portion when content is not being presented.

A second computing device, such as a user device or the like, may be proximate to the first computing device while the audio signal is being emitted by the first computing device. The second computing device may use a microphone, or similar component, to detect soundwaves of the audio signal. For example, the second computing device may detect soundwaves of the audio signal emitted at the one or more ultrasonic and/or near-ultrasonic that correspond to the inaudible portion of the audio stream. The second computing device may decode the first identifier from the inaudible portion of the audio signal using one or more a dual-tone multi-frequency signaling process, a discrete Fourier transform, a combination thereof, and/or the like. The second computing device may send the first identifier to the control device. The second computing device may also send the first identifier along with a second identifier associated with the second computing device to the control device. The second identifier may be a MAC address associated with the second computing device. The control device may associate, or map, the second identifier with a date and/or a time, such as a date and time at which the second computing device sent the second identifier. The control device may determine the first identifier and the second identifier are associated with the subscriber profile. The control device may associate, or map, the second identifier with the location identifier indicating the geographic location of the first computing device (e.g., based on the first identifier and the second identifier being associated with the subscriber profile).

The control device may take an action(s) in response to receiving the first identifier from the second computing device. For example, the control device may send an indication to the first computing device that the second computing device is present at the geographic location (e.g., a room or area of a home, a dwelling, a building, etc.). As another example, the control device may send a command to the first computing device that is associated with one or more user preferences present within the subscriber profile, such as lighting preferences, video and/or audio presentation settings, a combination thereof, and/or the like. The first computing device, after receiving the indication and/or the command from the control device, may cause presentation of a content item to be modified based on a user profile associated with the second computing device and/or the subscriber profile. For example, the user profile may indicate one or more preferences for content presentation, such as a level of volume, closed captioning display, secondary content presentation (e.g., supplemental content and/or advertisements/commercials), ambient light settings, a combination thereof, and/or the like. As a further example, the control device may send a command to a third computing device. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device, the third computing device may cause presentation of the content item and/or one or more settings of the third computing device to be modified based on the user profile associated with the second computing device and/or the subscriber profile.

In another example, the second computing device may receive/detect the ultrasonic audio signal emitted by the first computing device. The second computing device may send an indication to the first computing device that the second computing device received/detected the ultrasonic audio signal. The first computing device may receive the indication via the second computing device. The first computing device may cause presentation of content to be modified based on the indication received from the second computing device and the user profile associated with the second computing device.

In some examples, the first computing device may not encode the first identifier into the audio signal. Instead, the first computing device may emit the audio signal at a first frequency of the one or more ultrasonic and/or near-ultrasonic frequencies. The audio signal may be an ultrasonic and/or near-ultrasonic signal. The first frequency may be at or above 20,000 Hz. In this way, the first computing device may emit the audio signal at the first frequency such that it may be inaudible to persons nearby the first computing device.

The first computing device may emit the audio signal at the first frequency during presentation of content (e.g., the audio signal at the first frequency may be emitted by the first computing device simultaneously with an audio signal of a content item). Additionally, or in the alternative, the first computing device may emit the audio signal at the first frequency when content is not being presented. The second computing device may be proximate to the first computing device while the audio signal at the first frequency is being emitted by the first computing device. The second computing device may use a microphone, or similar component, to detect soundwaves of the audio signal at the first frequency.

The second computing device may determine the first frequency using the detected soundwaves. The second computing device may be configured to associate any detected soundwaves at the first frequency with the first computing device (e.g., to identify the first computing device), and the second computing device may send an indication when detecting soundwaves at the first frequency. As another example, the second computing device may be configured to provide the indication when receiving soundwaves that are determined to be within a range of frequencies, and the first frequency may be within the range of frequencies. The second computing device may send the indication to the control device.

The control device may be a separate entity, or it may be resident at the first computing device. For example, the control device may be a component, module, or any other element within the first computing device, in which case the second computing device may send the indication to the first computing device. Further, the control device may be a separate entity that is located proximate to the first computing device (e.g., at the geographic location). Other configurations of the control device are possible.

The second computing device may send the indication along with the second identifier associated with the second computing device. The control device (or the first computing device where the control device is resident) may associate, or map, the second identifier with a date and/or a time, such as a date and time at which the second computing device sent the indication and the second identifier. The control device (or the first computing device where the control device is resident) may determine that the second identifier is associated with the subscriber profile. The control device (or the first computing device where the control device is resident) may associate, or map, the second identifier with the location identifier indicating the geographic location of the first computing device (e.g., based on the second identifier being associated with the subscriber profile). The control device (or the first computing device where the control device is resident) may determine that a user associated with the subscriber profile is proximate to the first computing device based on receiving the indication from the second computing device.

An action(s) may be taken in response to receiving the indication from the second computing device. For example, the control device may send an indication to the first computing device that the second computing device is present at the geographic location. Alternatively, when the control device is resident at the first computing device, the first computing device may determine that the second computing device is present at the geographic location based on receiving the indication from the second computing device that the audio signal at the first frequency was detected. As another example, the control device may send a command to the first computing device that is associated with the one or more user preferences present within the subscriber profile, such as lighting preferences, video and/or audio presentation settings, a combination thereof, and/or the like. As a further example, in configurations where the control device is resident at the first computing device, the first computing device may take the action based on receiving the indication from the second computing device that the audio signal at the first frequency was detected.

The first computing device may cause presentation of the content item to be modified based on the user profile associated with the second computing device and/or the subscriber profile. For example, the user profile may indicate the one or more preferences for content presentation, such as a level of volume, closed captioning display, secondary content presentation (e.g., supplemental content and/or advertisements/commercials), ambient light settings, a combination thereof, and/or the like.

As a further example, the control device (or the first computing device where the control device is resident) may send a command to the third computing device. The command sent to the third computing device may be associated with the one or more user preferences present within the subscriber profile, such as lighting preferences, video and/or audio presentation settings, a combination thereof, and/or the like. After receiving the command from the control device (or the first computing device where the control device is resident), the third computing device may cause presentation of the content item and/or one or more settings of the third computing device to be modified based on the user profile associated with the second computing device and/or the subscriber profile.

An emergency network server, such as a server associated with an emergency dispatching service, may receive an emergency communication, such as an e-911 telephone call, that includes, among other things, the second identifier. The emergency network server may send a location request to the control device in response to receiving the emergency communication. The location request may include the second identifier and a date and/or time at which the emergency communication was received. The control device may determine the second computing device is located at the geographic location based on the association, or mapping, of the second identifier to the geographic location and the date and/or time at which the second computing device sent the second identifier to the control device. The control device may send a location request response to the emergency network server. The location request response may indicate the location identifier and the date and/or time at which the second computing device sent the second identifier to the control device.

FIG. 1 shows an example system 100 for content delivery and presence detection. Those skilled in the art will appreciate that digital equipment and/or analog equipment may be employed. One skilled in the art will appreciate that provided herein is a functional description and that the respective functions may be performed by software, hardware, or a combination of software and hardware. The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., a user location 119) via a network 116 (e.g., content distribution and/or access system).

The central location 101 may receive content from a variety of sources 102a, 102b, and 102c. The content may be sent from any of the sources 102a, 102b, or 102c to the central location 101 via a variety of transmission paths, including wireless paths (e.g., satellite paths 103a, 103b) and terrestrial paths 104. The central location 101 may also receive content from input 106, such as a direct feed source, via a direct line 105 (e.g., one or more communication links and/or one or more communication paths). Other input sources may be capture devices such as a video camera 109 or a server 110. The content sent by the content sources may include a single content item, a portion of a content item (e.g., content fragment), a content stream, a multiplex that includes several content items, and/or the like. The content item may be a movie, a show, a newscast, an advertisement, an informational/instructional video/message, a combination thereof, and/or the like.

The central location 101 may have one or a plurality of receivers 111a, 111b, 111c, 111d that are associated with one or more corresponding input sources. The central location 101 may include one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from a video camera 109 and/or other source and apply one or more encoding algorithms to the received content. A switch 113 may provide access to a server 110, which may be a Pay-Per-View server, a data server, an internet router, a network system, a phone system, and the like. Some signals may require additional processing, such as signal multiplexing, prior to being modulated. Such multiplexing may be performed by a multiplexer 114.

The central location 101 may include one or more modulators 115 for interfacing with a network 116. A modulator may receive content from a receiver 111, an encoder 112, a multiplexer 114, and/or the like. A modulator 115 may convert the received content into a modulated output signal suitable for transmission over the network 116. A modulator 115 may map portions of the content to data bits expressed as signals (e.g., sinusoidal signals) at corresponding subcarrier frequencies of a data symbol. The output signals from the modulator 115 may be combined (e.g., packaged), using equipment such as a combiner 117 (e.g., a packaging device), for input into the network 116.

The network 116, and the system 100 generally, may be a content distribution network, a content access network, and/or the like. The network 116 may be configured to send content from a variety of sources using a variety of network paths, protocols, devices, and/or the like. The network 116 may be managed (e.g., deployed, serviced) by a content provider, a service provider, and/or the like. The network 116 may have a plurality of communication links connecting a plurality of devices.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network 116 (e.g., for communications via in-band and/or out-of-band signals of a content delivery network) and/or connected to the network 116 via a communication terminal 122 ("CT") (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not necessarily be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park, etc.).

The system 100 may have one or more content sources 127. The content source 127 may be configured to send content (e.g., video, audio, games, applications, data) to the user. The content source 127 may be configured to send streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to send the content via a packet switched network path, such as via an internet protocol ("IP") based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like. The network 116 may have a network component 129. The network component 129 may be any device, module, and/or the like communicatively coupled to the network 116. The network component 129 may be a router, a switch, a splitter, a packager, a gateway, an encoder, a storage device, a multiplexer, a network access location (e.g., tap), physical link, and/or the like.

The system 100 may have an edge device 128. The edge device 128 may be configured to provide content, services, and/or the like to the user location 119. The edge device 128 may be one of a plurality of edge devices distributed across the network 116. The edge device 128 may be located in a region proximate to the user location 119. A request for content from the user may be directed to the edge device 128 (e.g., due to the location of the edge device and/or network conditions). The edge device 128 may be configured to receive packaged content (e.g., from the central location 101 and/or any of the sources 102a, 102b, or 102c) for delivery to the user, convert content for delivery to the user (e.g., in a specific format requested by a user device), send the user a manifest file (e.g., or other index file describing portions of the content), send streaming content (e.g., unicast, multicast), provide a file transfer, and/or the like. The edge device 128 may cache or otherwise store content (e.g., frequently requested content) to enable faster delivery of content to users.

The edge device 128 may receive a request for content from the user location 119. The edge device 128 may receive a request for content from a client device (e.g., the media device 120, the communication terminal 122, etc.). The edge device 128 may establish a communication link with the client device. The edge device 128 may determine whether the edge device 128 has access to the requested content. The edge device 128 may determine whether the edge device 128 has access to the requested content after receiving the request for content from the client device. The edge device 128 may determine whether a cache associated with the edge device 128 has the requested content (e.g., a mid-tier cache, such as the central location 101). If the edge device 128 does not have access to the requested content, the edge device 128 may request the requested content from the central location 101, a different edge device 128 and/or the content source 127.

The edge device 128 may establish a communication link with the central location 101, a different edge device 128 and/or the content source 127 to receive the requested content. The edge device 128 may track the content received from the central location 101, a different edge device 128 and/or the content source 127. The control system 118 may determine that the central location 101 does not have access to the requested content. The control system 118 may establish a communication link with input source 102a (e.g., based on the request for the content). The input source 102a may send a redirect message to the control system 118 indicating that the requested content is available from an input source, such as, for example, input source 102b. The central location may receive the requested content from input source 102b and provide the requested content to the edge device 128 for delivery to the user.

The media device 120 and/or the display device 121 may use ultrasonic and/or near-ultrasonic communication to determine a presence of a person or object proximate thereto, such as a person or object in a same room of the media device 120 (e.g., 0-20 feet apart). For purposes of describing the present methods, systems, and apparatuses, reference will be made to the media device 120 as the device that uses ultrasonic and/or near-ultrasonic communication; however, it is to be understood that the same description may apply to the display device 121 or any other suitable general purpose computing device, such as a content streaming/presentation device, a smart device, a smart appliance, and the like. The media device 120 may be assigned a first identifier by a control device, such as the central location 101 or the edge device 126. For example, the media device 120 may execute an initialization process, such as a startup procedure(s) executed during a booting phase, and during the initialization process the media device 120 may receive the first identifier from the control device. The first identifier may be a media access control ("MAC") address associated with the media device 120. For purposes of describing the present methods, systems, and apparatuses, reference will be made to the central location 101 as being the control device; however, it is to be understood that the same description may apply to the edge cache 126 or any other server in communication with the media device 120. The central location 101 may associate, or map, the first identifier with a subscriber profile associated with the first identifier. The subscriber profile may include a location identifier indicating the user location 119, such as a geographic location, a location within a structure/building, an area of interest, a combination thereof and/or the like. The central location 101 may associate, or map, the first identifier with a date and/or a time, such as a date and/or time at which the control device assigned the first identifier to the media device 120.

The media device 120 may utilize sonic signaling, such as ultrasonic and/or near-ultrasonic communication techniques, to transmit information. For example, the media device 120 may use one or more ultrasonic and/or near-ultrasonic frequencies to encode the first identifier into an audio signal using one or more a dual-tone multi-frequency signaling process, a discrete Fourier transform, a combination thereof, and/or the like. The average person can perceive sound between approximately 20 and 20,000 Hz. The audio signal may be an ultrasonic and/or near-ultrasonic signal. The media device 120 may emit the audio signal—or a portion thereof representing the encoded first identifier—at or above 20,000 Hz such that it may be inaudible to humans.

As a further example, the media device 120 may use a microphone or other sound-receiving device to detect an audio sample of soundwaves within the proximity of the media device 120. From the audio sample, the media device 120 may ascertain one or more frequencies of an acoustic spectrum on which the media device 120 does not detect any sound (hereinafter, "one or more vacant frequencies"). The one or more vacant frequencies may include one or more ultrasonic and/or near-ultrasonic frequencies at or above 20,000 Hz. The media device 120 may use the one or more vacant frequencies to transmit information. For example, the media device 120 may use the one or more vacant frequencies to encode the first identifier into an inaudible portion of an audio signal using one or more a dual-tone multi-frequency signaling process, a discrete Fourier transform, a combination thereof, and/or the like. The inaudible portion of the audio signal may be an ultrasonic and/or near-ultrasonic signal. One or more frequencies of the inaudible portion of the audio signal may correspond to the one or more vacant frequencies (e.g., frequencies at or above 20,000 Hz). The audio signal may be associated with content that is being presented such as a movie, a show, a commercial, a combination thereof, and/or the like. The media device 120 may emit the encoded audio signal—including the inaudible portion containing the encoded first identifier—during presentation of content. Additionally, or in the alternative, the media device 120 may emit the inaudible portion containing the encoded first identifier when content is not being presented. For example, the media device 120 may emit an audio signal containing only the inaudible portion when content is not being presented. The audio signal may be an ultrasonic and/or near-ultrasonic signal.

The mobile device 124 may be proximate to the media device 120 while the audio signal is being emitted by the media device 120. The mobile device 124 may use a microphone, or similar component, to detect soundwaves of the audio signal. For example, the mobile device 124 may detect soundwaves of the audio signal emitted at the one or more ultrasonic and/or near-ultrasonic frequencies that correspond to the inaudible portion of the audio stream. The mobile device 124 may decode the first identifier from the inaudible portion of the audio signal using one or more a dual-tone multi-frequency signaling process, a discrete Fourier transform, a combination thereof, and/or the like. The mobile device 124 may send the first identifier to the central location 101. The mobile device 124 may also send the first identifier along with a second identifier associated with the mobile device 124 to the central location 101. The central location 101 may associate, or map, the second identifier with a date and/or a time, such as a date and time at which the mobile device 124 sent the second identifier. The central location 101 may determine the first identifier and the second identifier are associated with the subscriber profile. The central location 101 may associate, or map, the second identifier with the location identifier indicating the user location 119 of the media device 120.

The central location 101 may take an action(s) in response to receiving the first identifier from the mobile device 124. For example, the central location 101 may send an indication to the media device 120 that the mobile device 124 is present at the user location 119. As another example, the central location 101 may send a command to the media device 120 that is associated with one or more user preferences present within the subscriber profile, such as lighting preferences, video and/or audio presentation settings, a combination thereof, and/or the like. The media device 120, after receiving the indication and/or the command from the central location 101, may cause presentation of a content item to be modified based on a user profile associated with the mobile device 124 and/or a subscriber profile. For example, the user profile may indicate one or more preferences for content presentation, such as a level of volume, closed captioning display, secondary content presentation (e.g., supplemental content and/or advertisements/commercials), ambient light settings, a combination thereof, and/or the like. As a further example, the central location 101 may send a command to an electronic device 131. The command sent to the electronic device 131 may be associated with the one or more user preferences present within the subscriber profile, such as lighting preferences, video and/or audio presentation settings, a combination thereof, and/or the like. The electronic device 131 may be a smart appliance, a smart lighting fixture/bulb, a smart audio and/or video presentation device, a thermostat, a combination thereof and/or the like. After receiving the command from the central location 101, the electronic device 131 may cause presentation of the content item to be modified based on the user profile associated with the mobile device 124 and/or the subscriber profile.

In another example, the mobile device 124 may receive/detect the ultrasonic audio signal emitted by the media device 120. The mobile device 124 may send an indication to the media device 120 that the mobile device 124 received/detected the ultrasonic audio signal. The media device 120 may receive the indication via the mobile device 124. The media device 120 may cause presentation of content to be modified based on the indication received from the mobile device 124 and the user profile associated with the mobile device 124.

The system 100 may have an emergency network server 126. The emergency network server 126 may provide services, such as emergency dispatching services, related to emergency communications, such as e-911 telephone calls, distress messages/signals, etc. The emergency network server 126 may send a location request to the central location 101 (e.g., via the network 116) in response to receiving an emergency communication from the mobile device 124. The location request may include the second identifier and a date and/or time at which the emergency communication was received by the emergency network server 126. The central location 101 may determine the mobile device 124 is located at the user location 119 based on the association, or mapping, of the second identifier to the user location 119 and the date and/or time at which the mobile device 124 sent the second identifier to the central location 101. The central location 101 may send a location request response to the emergency network server 126. The location request response may indicate the location identifier associated with the user location 119 and the date and/or time at which the mobile device 124 sent the second identifier to the central location 101. In this way, the emergency network server 126 may ascertain a location of the mobile device 124.

Figure 2:
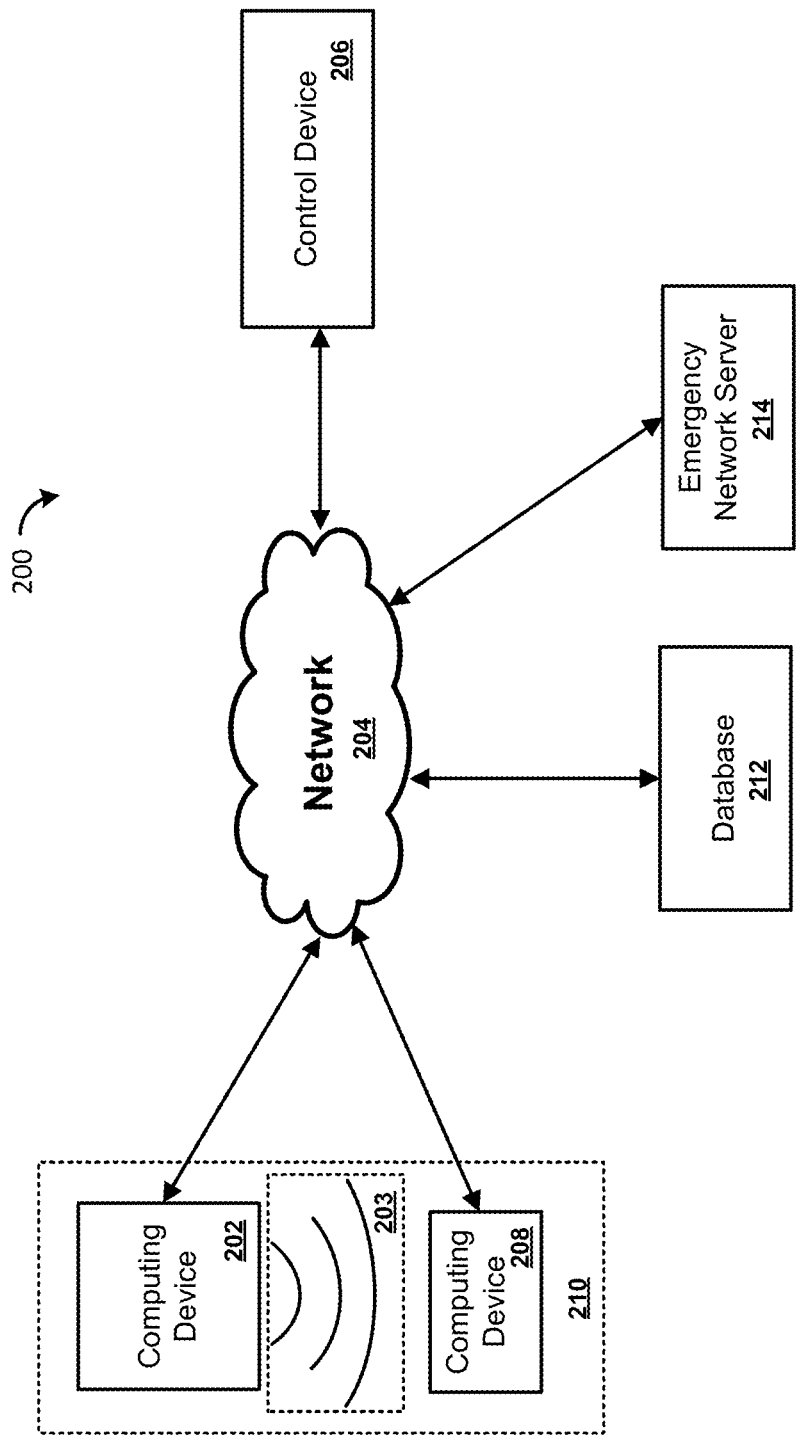
FIG. 2 shows an example system for presence detection.

FIG. 2 shows a system 200 for presence detection. The system 200 may include a control device 206, such as the central location 101 or the edge cache 126, and a first computing device 202, such as the media device 120 and/or the display device 121. The first computing device 202 may be located at a first location 210, such as the user location 119. The first computing device 202 may be in communication with the control device 206 via a network 204, such as the network 116. While FIG. 2 shows the control device 206 as being a separate entity, it is to be understood that the control device 206 may be resident at the first computing device 202. For example, the control device 206 may be a component, module, or any other element within the first computing device 202. Further, the control device 206 may be a separate entity that is located at the first location 210. Other configurations of the control device 206 are possible for the system 200.

The system 200 may include a second computing device 208, such as the mobile device 124. The system 200 may include a database 212, which may be a separate device or may be resident at the first computing device 202. The database 212 may be in communication with the control device 206 via the network 204. The database 212 may store associations/mappings between computing devices and physical locations. For example, the database 212 may store a mapping between a location identifier and an identifier for a computing device. The location identifier may indicate a geographic location, such as an address, at which a computing device is located, a location within a structure/building, an area of interest, a combination thereof and/or the like. While FIG. 2 shows the database 212 as being a separate entity, it is to be understood that the database 212 may be resident at the first computing device 202 and/or the control device 206. For example, the database 212 may be a component, module, or any other element within the first computing device 202 and/or the control device 20. Further, the database 212 may be a separate entity that is located at the first location 210. Other configurations of the database 212 are possible for the system 200.

Figure 3:
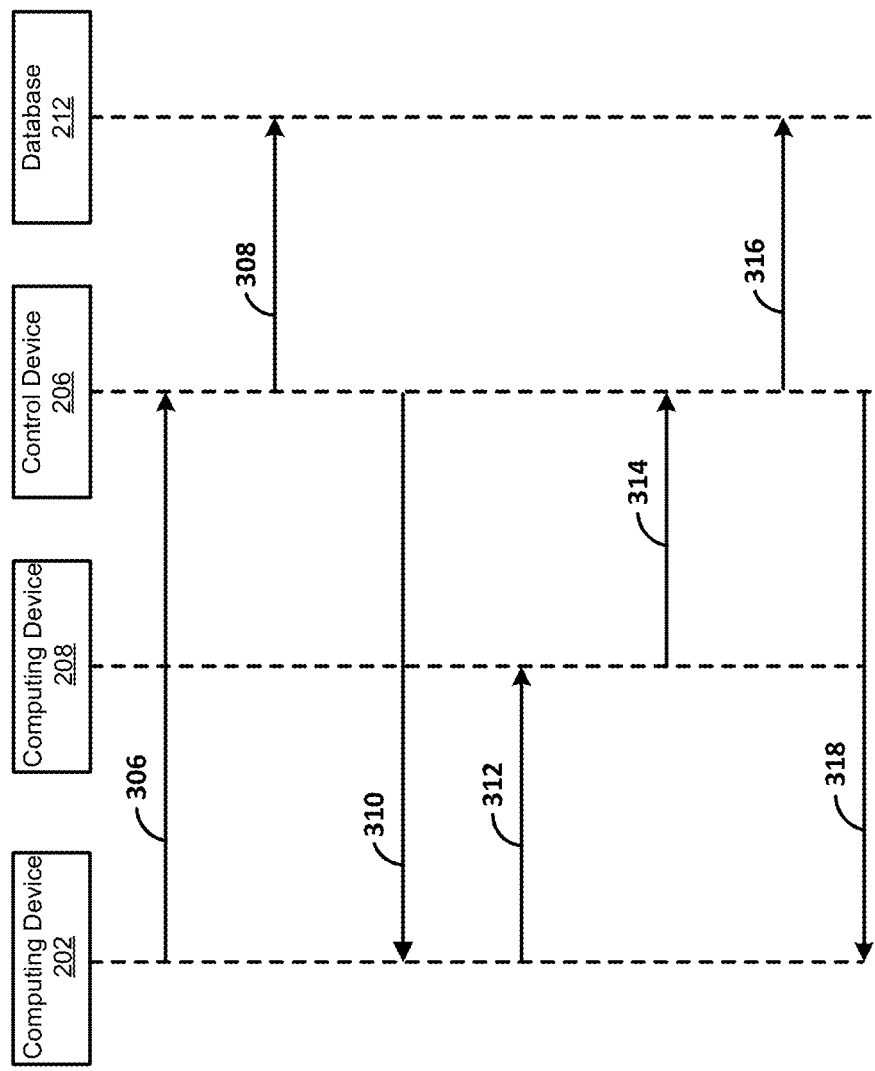
FIG. 3 shows an example series of communication flows for a presence detection system.

FIG. 3 shows an example series of communication flows for presence detection by the system 200. At communication flow 306, the first computing device 202 may send a communication to the control device 206. For example, the communication may be sent following the first computing device 202 executing an initialization process, such as a startup procedure(s) executed during a booting phase of the first computing device 202. The first computing device 202 may indicate to the control device 206 at communication flow 306 that it has executed the initialization process. Further, at communication flow 306, the first computing device 202 may provide to the control device 206 identifying information, such as an associated Internet Protocol ("IP") address, a subscriber identifier, a device identifier, such as a media access control ("MAC") address, a combination thereof, and/or the like. At communication flow 308, the control device 206 may query the database 212 for a first identifier associated with the first computing device 202. For example, the control device 206 may provide the identifying information to the database 212, which may resolve the identifying information and determine the first identifier associated with the first computing device. For example, the first identifier may be the IP address, the subscriber identifier, the MAC address, etc. As another example, the first identifier may be a randomly-generated identifier assigned by the control device 206 to the first computing device 202.

At communication flow 310, the first computing device 202 may receive the first identifier from the control device 206 via the network 204. The control device 206 may store an association, or mapping, of the first identifier with a subscriber profile associated with the first identifier in the database 212. The subscriber profile may include a location identifier indicating the first location 210. The control device 206 may store in the database 212 an association, or mapping, of the first identifier with a date and/or a time the first computing device 202 sent the communication to the control device at communication flow 306 (e.g., a date and/or a time at which the first computing device 202 executed the initialization process).

The first computing device 202 may utilize sonic signaling, such as ultrasonic and/or near-ultrasonic communication techniques, to assist in the determination of a presence of a person or object proximate thereto, such as a device (and by extension a user associated with the device) in a same room of the first computing device 202 (e.g., 0-20 feet apart). As used herein, sonic signaling refers generally to transmission of information using ultrasonic and/or near-ultrasonic frequencies. One example of sonic signaling is a signal in which one or more frequencies correspond to various signal values (e.g. dual-tone multi-frequency ("DTMF") signaling). Other examples of sonic signaling include amplitude shift keying, frequency shift keying, and phase shift keying—any of which may be utilized by the first computing device 202 and/or the control device 206 to determine a presence of a person or object proximate to the first computing device 202.

The first computing device 202 may utilize sonic signaling, such as ultrasonic and/or near-ultrasonic communication techniques, to transmit information. For example, the first computing device 202 may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device 202 may emit the audio signal—or a portion thereof representing the encoded first identifier—at or above 20,000 Hz such that it may be inaudible to humans.

Figure 4A:
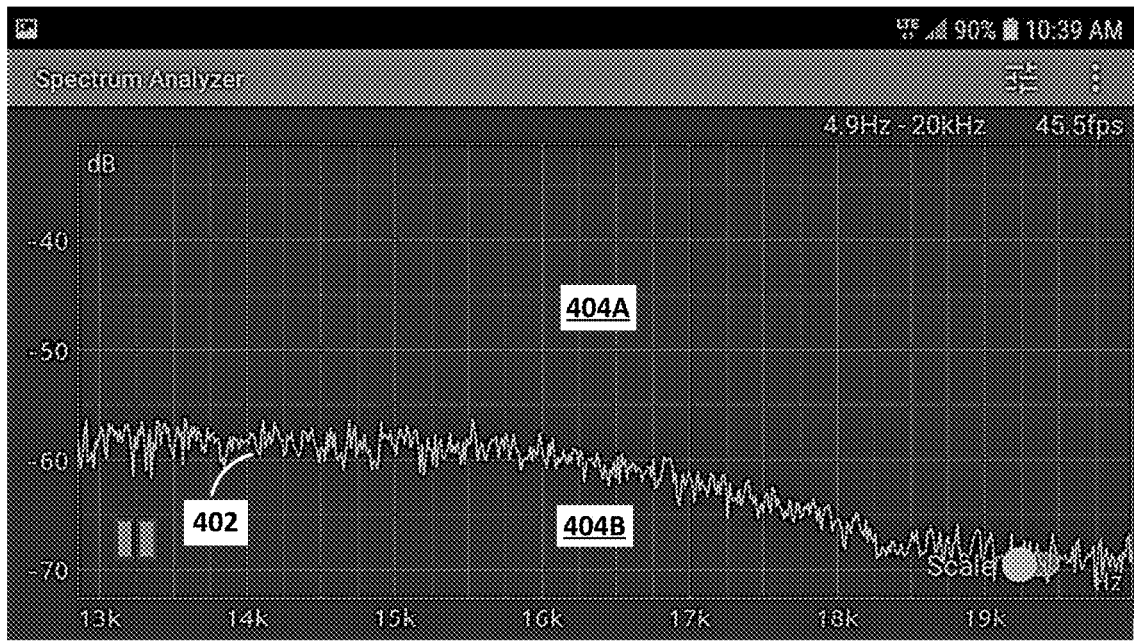
FIGS. 4A and 4B show example acoustic spectrums.

As a further example, the first computing device 202 may use a microphone or other sound-receiving device to detect an audio sample of soundwaves within the proximity of the first computing device 202. From the audio sample, the first computing device 202 may ascertain one or more frequencies of an acoustic spectrum on which the first computing device 202 does not detect any sound within the first location 210 (hereinafter, "one or more vacant frequencies"). An example of an acoustic spectrum is shown in FIG. 4A, where occupied acoustic spectrum (e.g., frequencies at which sound is detected) is represented by the line 402 and the one or more vacant frequencies are represented by the areas 404A and 404B above and below the line 402, respectively. The one or more vacant frequencies determined by the first computing device 202 may include one or more ultrasonic and/or near-ultrasonic frequencies on which the first computing device 202 does not detect any sound (e.g., no sounds within the one or more ultrasonic and/or near-ultrasonic frequencies are currently present). The first computing device 202 may use the one or more vacant frequencies to transmit information.

For example, the first computing device 202 may use the one or more vacant frequencies to encode the first identifier into an inaudible portion of an audio signal 203 using one or more a dual-tone multi-frequency signaling process, a discrete Fourier transform, a combination thereof, and/or the like. The inaudible portion of the audio signal may be an ultrasonic and/or near-ultrasonic signal. The first identifier may include a character string (e.g., a series of numbers and/or letters) that may be digitally encoded as a series of bits and modulated in a binary format as the inaudible portion of the audio signal 203. For example, the first computing device 202 may use multi-frequency signaling, such as spread spectrum communications or a multi-frequency carrier signaling, to designate a plurality of ultrasonic and/or near-ultrasonic frequencies, such as between 20 KHz and 22 KHz or between 20 KHz and 24 KHz. Each of the plurality of ultrasonic and/or near-ultrasonic frequencies may correspond to the one or more vacant frequencies. Each of the plurality of ultrasonic and/or near-ultrasonic frequencies may be separated by an interval, such as an interval of between 40 Hz and 100 Hz. For each such frequency of the plurality of ultrasonic and/or near-ultrasonic frequencies, the first computing device 202 may, for example, encode a "1" bit by emitting sound at the frequency and a "0" bit by not emitting sound at the frequency. As another example, the first computing device 202 may encode a "0" bit by emitting sound at the frequency or a "1" by not emitting sound at the frequency. In this way, one or more frequencies of the plurality of ultrasonic and/or near-ultrasonic frequencies may be used to encode the first identifier into the inaudible portion of the audio signal 203.

Figure 4B:
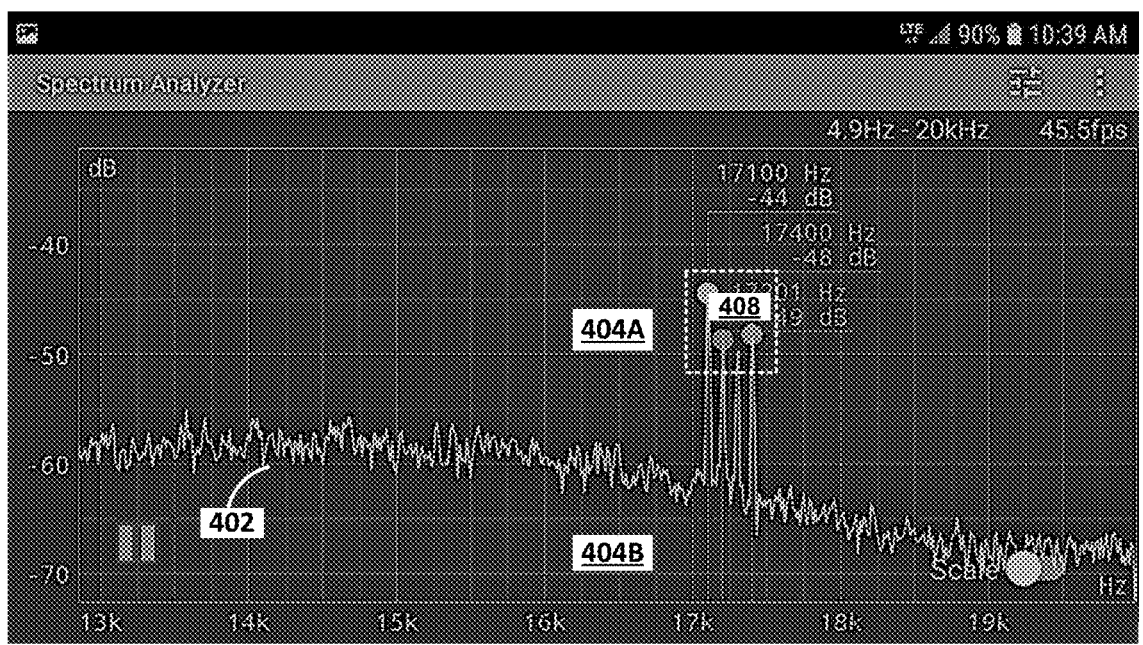

The first computing device 202 may emit the encoded audio signal 203 during presentation of content, such as a movie, a show, a commercial, a combination thereof, and/or the like. For example, the first computing device 202 may receive a radio frequency ("RF") signal (e.g., from a content source) and process the RF signal to provide a video stream and the audio signal 203 associated with a content item. The first computing device 202 may display the video stream on a screen and emit the audio signal 203 using a speaker (e.g., coupled to, or otherwise in communication with, the first computing device 202). The audio signal 203 may include the inaudible portion representing the encoded first identifier. For example, the plurality of ultrasonic and/or near-ultrasonic frequencies may include 17 KHz. The first computing device 202 may encode a "1" bit by emitting a sound, tone, etc., at 17 KHz. An example 4-bit encoded audio signal is shown in FIG. 4B, wherein the spectrum points 408 represent four bits of an identifier encoded into the areas 404A and 404B of the acoustic spectrum, which represent the one or more frequencies on which the first computing device 202 does not detect any sound. The audio signal 203 may be received by a second computing device 208 located within the first location 210. An audible portion of the audio signal 203 may be heard/perceived by a person, such as a user of the second computing device 208, while the inaudible portion of the audio signal 203 may not be heard/perceived by the person.

The second computing device 208 may periodically check for audio signals, such as the inaudible portion of the audio signal 203. For example, the second computing device 208 may use an application (e.g., a software application) that causes a microphone of the second computing device 208 to detect (e.g., receive) some, or all, detectable audio/sound. The application may be a native application or a third-party application. As another example, firmware resident on the second computing device 208 may cause the microphone of the second computing device 208 to detect (e.g., receive) some, or all, detectable audio/sound. The firmware may be associated with a component of the second computing device 208, such as a processor, a transceiver, a communications module, and the like. The firmware may cause the microphone of the second computing device 208 to detect sound at a regular interval (e.g., every 30 seconds). As a further example, a subroutine of an operating system resident on the second computing device 208 may cause the microphone of the second computing device 208 to detect (e.g., receive) some, or all, detectable audio/sound. The subroutine of an operating system may cause the microphone of the second computing device 208 to detect sound at a regular interval (e.g., every 30 seconds). Returning to FIG. 3, at communication flow 312, the second computing device 208 may receive/detect the audio signal 203 emitted by the speaker. Once the audio signal 203 is detected by the second computing device 208, the application may attempt to demodulate (e.g., decode) the inaudible portion of the audio signal 203 at the one or more frequencies of the plurality of ultrasonic and/or near-ultrasonic frequencies using the reverse process of the modulating (e.g., encoding) technique used by the first computing device 202 when encoding the audio signal 203. For example, the second computing device 208 may demodulate (e.g., decode) the inaudible portion of the encoded audio signal 203 using one or more of a dual-tone multi-frequency signaling process, a discrete Fourier transform, a combination thereof, and/or the like. The resulting demodulated inaudible portion of the audio signal 203 may represent a binary string (e.g., a sequence of 0's and 1's). The second computing device 208 may convert the binary string into the first identifier.

At communication flow 314, the second computing device 208 may send the first identifier to the control device 206. The second computing device 208 may send the first identifier along with a second identifier associated with the second computing device 208. The second identifier may be an associated IP address, a subscriber identifier, a device identifier, such as a MAC address, a combination thereof, and/or the like MAC address of the second computing device 208. At communication flow 316, the control device 206 may store in the database 212 an association, or a mapping, of the second identifier with a date and/or a time, such as a date and time at which the second computing device 208 sent the second identifier. The control device 206 may determine that the first identifier and the second identifier are associated with a subscriber profile (e.g., based on the identifying information). The subscriber profile may be stored in the database 212, and the subscriber profile may include a location identifier indicating the first location 210. The control device 206 may store in the database 212 an association, or a mapping, of the second identifier with the location identifier. At communication flow 318, the control device 206 may send an indication and/or a command as described herein to the first computing device 202. The indication and/or the command may indicate that the second computing device 208 is present at the first location 210.

Figure 5:
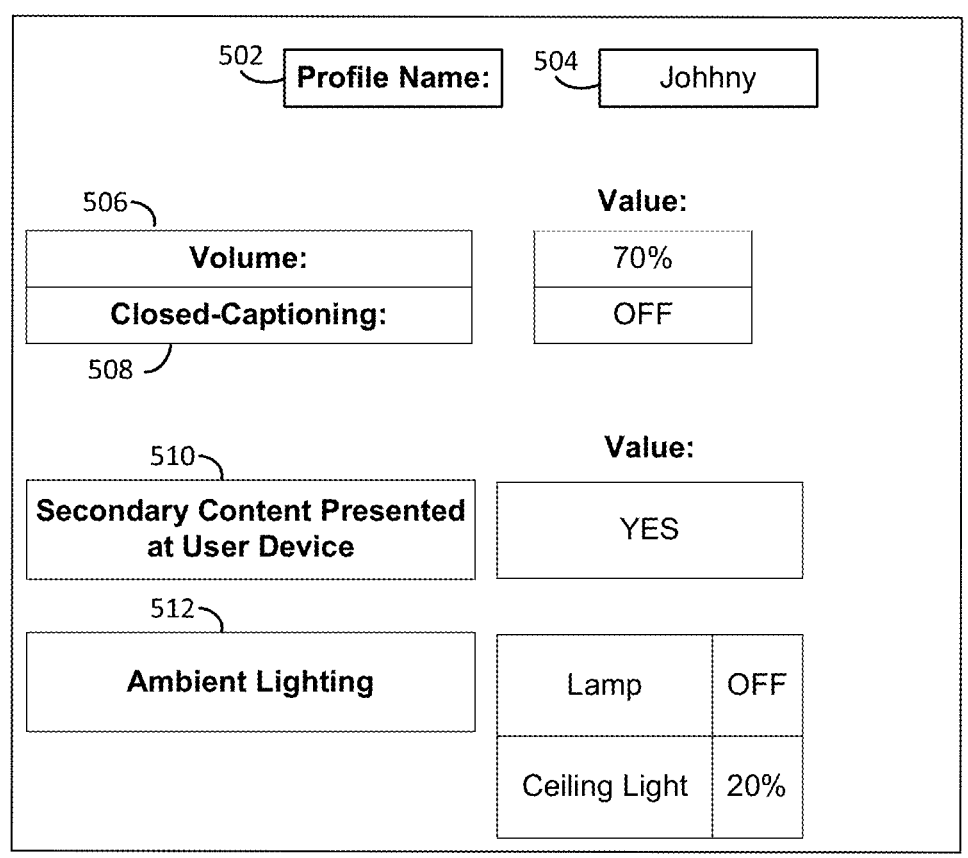
FIG. 5 shows an example user profile interface.

The first computing device 202, after receiving the indication and/or the command, may cause an action to be taken. For example, presentation of a content item to be modified based on a user profile associated with the second computing device 208. An example user profile interface 500 is shown in FIG. 5. The user profile interface 500 may be stored at the first computing device 202, the second computing device 208, the control device 208, and/or the database 212. The user profile interface 500 may indicate one or more preferences for content presentation, such as a level of volume 506, a closed captioning display preference 508, secondary content presentation preference 510 (e.g., supplemental content and/or advertisements/commercials), ambient light settings 512, a combination thereof, and/or the like. Other preferences for content presentation may be provided by the user profile interface 500 (not shown). As a further example, the control device 206 may send a command to a third computing device, such as the electronic device 131 of FIG.

1. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device 206, the third computing device may cause presentation of the content item and/or one or more settings of the third computing device to be modified based on the user profile associated with the second computing device 208 and/or the subscriber profile.

As described herein, though not shown in the example series of communication flows in FIG. 3, the second computing device 208 may send the first identifier to the first computing device 202 along with the second identifier associated with the second computing device 208. The first computing device 202 may receive the first identifier and the second identifier via the second computing device 208. The first computing device 202 may send an indication of receiving the first identifier and the second identifier to the control device 206. The control device 206 may indicate to the first computing device 202 that the second computing device 208 is currently located at the geographic location. The first computing device 202 may cause presentation of content to be modified based on the indication received from the control device 206 and the user profile associated with the second computing device 208.

Returning to FIG. 2, the system 200 may include an emergency network server 214, such as the emergency network server 126 of FIG. 1. The emergency network server 214 may provide services, such as emergency dispatching services, related to an emergency communication, such as e-911 telephone calls, distress messages/signals, etc. For example, the emergency network server 214 may communicate with public safety answering points (PSAPs) that receive and administer emergency communications. When routing an emergency call to a PSAP, the emergency network server 214 may use a telephone number of a calling party to acquire location information of the telephone/mobile device that originates the emergency communication. However, in some contexts, such as Voice over Internet Protocol ("VoIP") communication, the emergency communication may be received by a PSAP without a telephone number or any other location information.

The emergency network server 214 may send a location request to the control device 206 via the network 204 in response to receiving the emergency communication. The emergency communication may originate from the second computing device 208. The location request may include the second identifier and a date and/or time at which the emergency communication was received. The control device 206 may determine the second computing device 208 is located at the first location 210 based on the association, or mapping, of the second identifier to the first location 210 and the date and/or time at which the second computing device 208 sent the second identifier to the control device 206. For example, the control device 206 may determine the date and/or time at which the emergency communication was received is within a specific length of time (e.g., a number of minutes, hours, etc.) after the control device 206 received the indication of presence from the second computing device 208. The control device 206 may send a location request response to the emergency network server 214. The location request response may indicate the location identifier and the date and/or time at which the second computing device 208 sent the second identifier to the control device 206. In this way, the emergency network server 126 may ascertain a location of the second computing device 208 and provide the location to emergency personnel.

Figure 6:
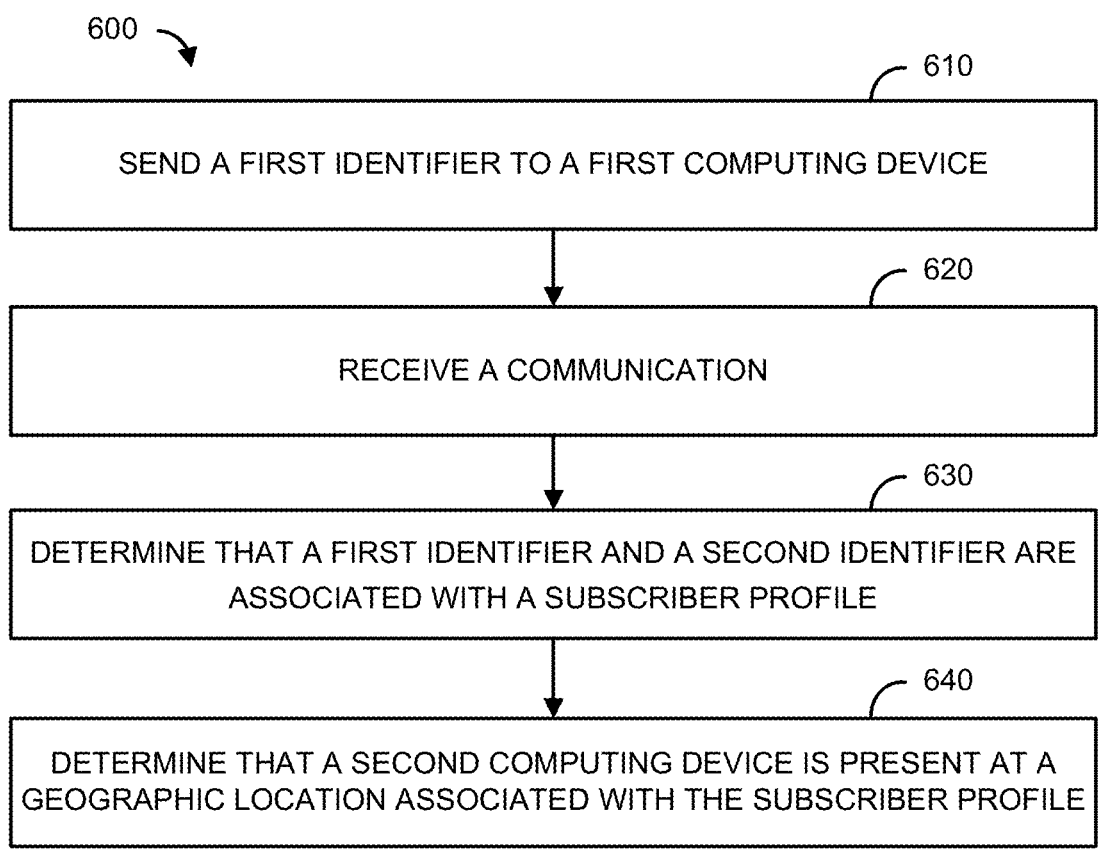
FIG. 6 shows a flowchart of an example method for presence detection.

FIG. 6 is a flowchart of an example method 600 for presence detection in accordance with the present description. The method 600 may be implemented using the system 100 of FIG. 1 and/or the system 200 of FIG. 2. For example, the method 600 may be implemented by the central location 101, the edge device 128, or the control device 206. At step 610, a control device may send a first identifier to a first computing device. The control device may be a cache device or a headend of a content distribution network. The control device may send the first identifier in response to receiving an indication of an initialization process sent by the first computing device to the control device. The initialization process may be a startup procedure(s) executed during a booting phase of the first computing device and/or when the first computing device connects to a network. When sending the indication of the initialization process, the first computing device may provide identifying information to the control device, such as an associated Internet Protocol ("IP") address, a subscriber identifier, a device identifier, such as a media access control ("MAC") address, a combination thereof, and/or the like. The control device may query a database for the first identifier. For example, the control device may provide the identifying information to the database, and the database may resolve the identifying information and determine the first identifier associated with the first computing device. The first identifier may be the IP address, the subscriber identifier, the MAC address, etc. The control device may associate, or map, the first identifier with a subscriber profile. The subscriber profile may include a location identifier indicating a geographic location, such as an address (e.g., number, street, city, state, and country), at which the first computing device is located. The control device may associate, or map, the first identifier with a date and/or a time, such as a date and/or time at which the first computing device executed the initialization process.

The first computing device may utilize sonic signaling, such as ultrasonic and/or near-ultrasonic communication techniques, to transmit information. For example, the first computing device may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device may emit the audio signal—or a portion thereof representing the encoded first identifier—at or above 20,000 Hz such that it may be inaudible to humans.

As another example, the first computing device may use a microphone or other sound-receiving device to detect an audio sample of soundwaves proximate to the first computing device. From the audio sample, the first computing device may ascertain one or more frequencies of an acoustic spectrum on which the first computing device does not detect any sound (hereinafter, "one or more vacant frequencies"). The one or more vacant frequencies may include one or more ultrasonic and/or near-ultrasonic frequencies. The first computing device may use the one or more ultrasonic and/or near-ultrasonic frequencies to encode the first identifier into an inaudible portion of an audio signal. The inaudible portion of the audio signal may be an ultrasonic and/or near-ultrasonic signal. The first computing device may emit the audio signal—including the inaudible portion containing the encoded first identifier—during presentation of a content item, such as a movie, a show, a commercial, a combination thereof, and/or the like (e.g., the inaudible portion may be emitted by the first computing device simultaneously with an audio signal of a content item). Additionally, or in the alternative, the first computing device may emit the inaudible portion containing the encoded first identifier when content is not being presented. For example, the first computing device may emit an audio signal containing only the inaudible portion when content is not being presented.

A second computing device, such as a user device, a mobile device, or the like, may detect soundwaves of the audio signal via a microphone. For example, the second computing device may detect soundwaves of the audio signal emitted at the one or more ultrasonic and/or near-ultrasonic frequencies that correspond to the inaudible portion of the audio signal. The second computing device may decode the first identifier from the inaudible portion of the audio signal using one or more a dual-tone multi-frequency signaling process, a discrete Fourier transform, a combination thereof, and/or the like. At step 620, a communication may be received (e.g., by the control device) from the second computing device. For example, the communication may be an indication of presence. The communication may include the first identifier along with a second identifier associated with the second computing device. The second identifier may be a MAC address associated with the second computing device.

The control device may associate, or map, the second identifier with a date and/or a time, such as a date and time at which the second computing device sent the second identifier. At step 630, the control device may determine that the first identifier and the second identifier are associated with the subscriber profile, which includes the location identifier. The control device may associate, or map, the second identifier with the location identifier, which may indicate a geographic location (e.g., based on the first identifier and the second identifier being associated with the subscriber profile).

At step 640, based on the subscriber profile and the indication of presence, the control device may determine that the second computing device is present at the geographic location associated with the location identifier (e.g., a room or area of a home, dwelling, office, building, etc.). The control device may send an indication to the first computing device that the second computing device is present at the geographic location. The first computing device, after receiving the indication, may cause presentation of a content item to be modified based on a user profile associated with the second computing device. For example, the user profile may indicate one or more preferences for content presentation, such as a level of volume, closed captioning display, secondary content presentation (e.g., supplemental content and/or advertisements/commercials), ambient light settings, a combination thereof, and/or the like. As a further example, the control device may send a command to a third computing device. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device, the third computing device may cause presentation of the content item and/or one or more settings of the third computing device to be modified based on the user profile associated with the second computing device and/or the subscriber profile.

Figure 7:
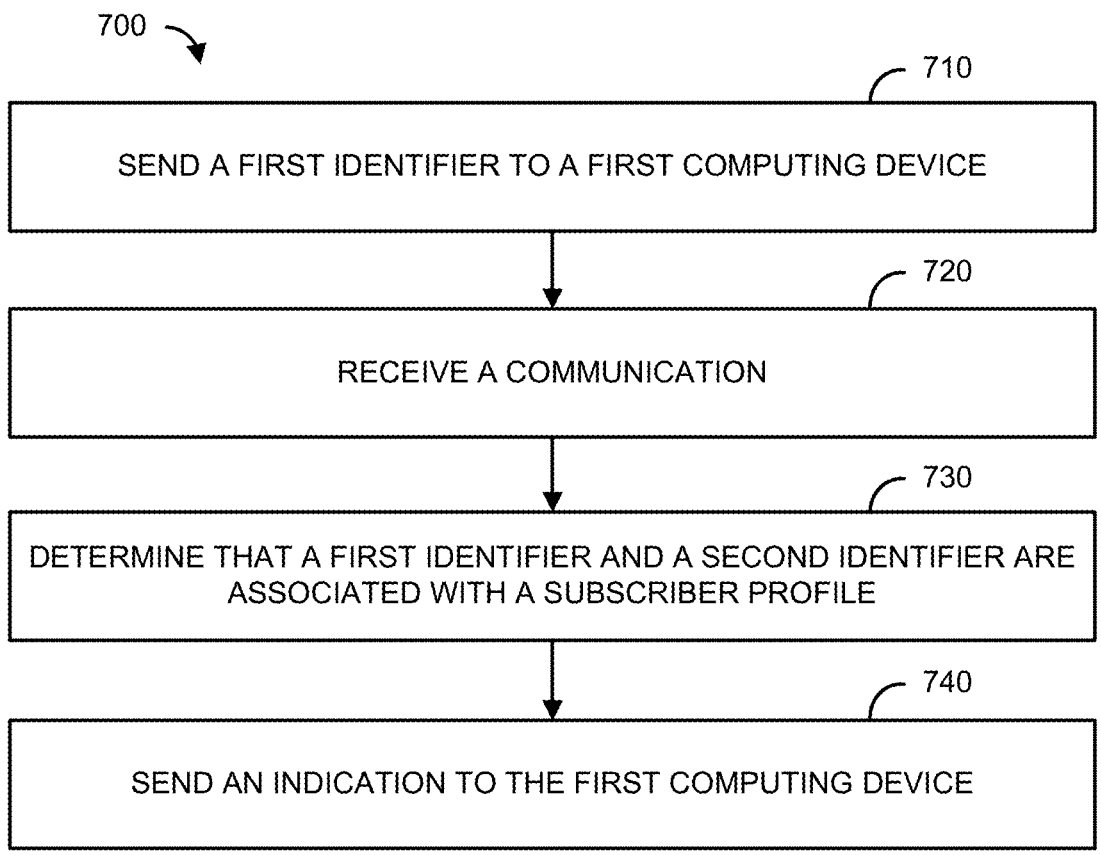
FIG. 7 shows a flowchart of an example method for presence detection.

FIG. 7 is a flowchart of an example method 700 for presence detection in accordance with the present description. The method 700 may be implemented using the system 100 of FIG. 1 and/or the system 200 of FIG. 2. For example, the method 700 may be implemented by the central location 101, the edge device 128, or the control device 206. At step 710, a control device may send a first identifier to a first computing device. The control device may be a cache device or a headend of a content distribution network. The control device may send the first identifier in response to receiving an indication of an initialization process sent by the first computing device to the control device. The initialization process may be a startup procedure(s) executed during a booting phase of the first computing device and/or when the first computing device connects to a network. The first identifier may be a media access control ("MAC") address associated with the first computing device. The control device may associate, or map, the first identifier with a subscriber profile associated with the first identifier. The subscriber profile may include a location identifier indicating a geographic location, such as an address (e.g., number, street, city, state, and country), at which the first computing device is located. The control device may associate, or map, the first identifier with a date and/or a time, such as a date and/or time at which the first computing device executed the initialization process.

The first computing device may utilize sonic signaling, such as ultrasonic and/or near-ultrasonic communication techniques, to transmit information. For example, the first computing device may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device may emit the audio signal—or a portion thereof representing the encoded first identifier—at or above 20,000 Hz such that it may be inaudible to humans.

As a further example, the first computing device may use a microphone or other sound-receiving device to detect an audio sample of soundwaves within a proximity of the first computing device. From the audio sample, the first computing device may ascertain one or more frequencies of an acoustic spectrum on which the media device 120 does not detect any sound (hereinafter, "one or more vacant frequencies"). The one or more vacant frequencies may include one or more ultrasonic and/or near-ultrasonic frequencies. The first computing device may use the one or more vacant frequencies to encode the first identifier into an inaudible portion of an audio signal using one or more a dual-tone multi-frequency signaling process, a discrete Fourier transform, a combination thereof, and/or the like. The inaudible portion of the audio signal may be an ultrasonic and/or near-ultrasonic signal. One or more frequencies of the inaudible portion of the audio signal may correspond to the one or more vacant frequencies (e.g., frequencies at or above 20,000 Hz). The audio signal may be associated with content that is being presented such as a movie, a show, a commercial, a combination thereof, and/or the like. The first computing device may emit the encoded audio signal—including the inaudible portion containing the encoded first identifier—during presentation of content. Additionally, or in the alternative, the first computing device may emit the inaudible portion containing the encoded first identifier when content is not being presented. For example, the first computing device may emit an audio signal containing only the inaudible portion when content is not being presented. The audio signal may be an ultrasonic and/or near-ultrasonic signal.

A second computing device, such as a user device, a mobile device, or the like, may detect soundwaves of the audio signal via a microphone. For example, the second computing device may detect soundwaves of the audio signal emitted at the one or more ultrasonic and/or near-ultrasonic frequencies that correspond to the inaudible portion of the audio stream. The second computing device may decode the first identifier from the inaudible portion of the encoded audio signal using one or more a dual-tone multi-frequency signaling process, a discrete Fourier transform, a combination thereof, and/or the like. At step 720, a communication may be received (e.g., by the control device) from the second computing device. For example, the communication may be an indication of presence. The communication may include the first identifier along with a second identifier associated with the second computing device. The second identifier may be a MAC address associated with the second computing device.

The control device may associate, or map, the second identifier with a date and/or a time, such as a date and time at which the second computing device sent the second identifier. At step 730, the control device may determine that the first identifier and the second identifier are associated with the subscriber profile, which includes the location identifier. The control device may associate, or map, the second identifier with the location identifier, which may indicate a geographic location (e.g., based on the first identifier and the second identifier being associated with the subscriber profile).

Based on the subscriber profile and the indication of presence, the control device may determine that the second computing device is present at the geographic location associated with the location identifier. At step 740, the control device may send an indication to the first computing device that the second computing device is present at the geographic location. The first computing device, after receiving the indication, may cause presentation of a content item to be modified based on a user profile associated with the second computing device. For example, the user profile may indicate one or more preferences for content presentation, such as a level of volume, closed captioning display, secondary content presentation (e.g., supplemental content and/or advertisements/commercials), ambient light settings, a combination thereof, and/or the like. As a further example, the control device may send a command to a third computing device. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device, the third computing device may cause presentation of the content item and/or one or more settings of the third computing device to be modified based on the user profile associated with the second computing device and/or the subscriber profile.

An emergency network server, such as a server associated with an emergency dispatching service, may receive an emergency communication, such as an e-911 telephone call, that includes, among other things, the second identifier. The emergency network server may send a location request to the control device in response to receiving the emergency communication. The location request may include the second identifier and a date and/or time at which the emergency communication was received. The control device may determine the second computing device is located at the geographic location based on the association, or mapping, of the second identifier to the geographic location and the date and/or time at which the second computing device sent the second identifier to the control device. The control device may send a location request response to the emergency network server. The location request response may indicate the location identifier and the date and/or time at which the second computing device sent the second identifier to the control device.

Figure 8:
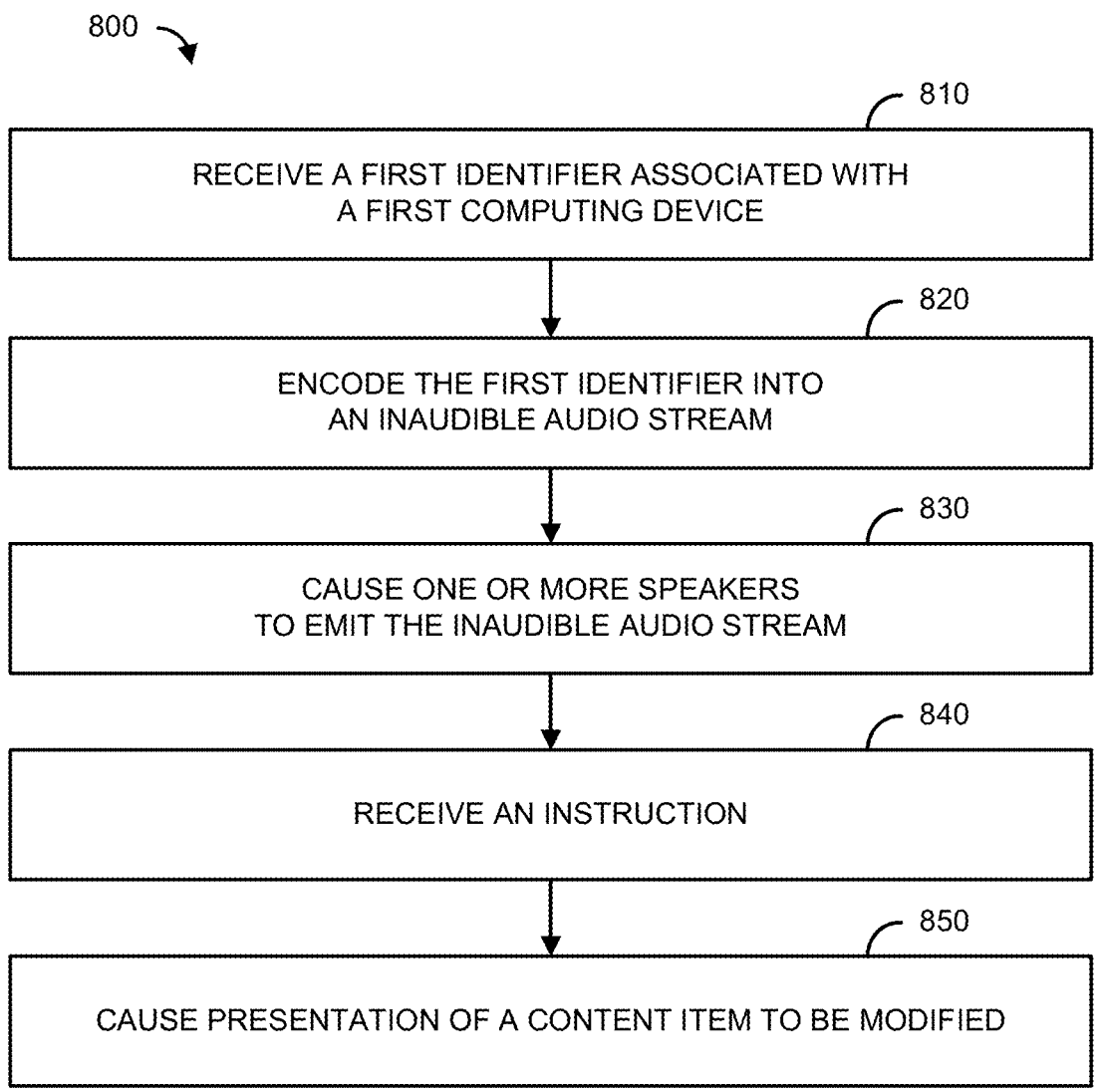
FIG. 8 shows a flowchart of an example method for presence detection.

FIG. 8 is a flowchart of an example method 800 for presence detection in accordance with the present description. Method 800 may be implemented using the system 100 of FIG. 1 and/or the system 200 of FIG. 2. For example, the method 800 may be implemented by a first computing device, such as the media device 120, the display 121, or the first computing device 202. The first computing device may execute an initialization process, such as a startup procedure(s) executed during a booting phase of the first computing device, and the first computing device may indicate it has executed the initialization process to a control device, such as the central location 101, the edge device 128, or the control device 206. The control device may query a database for a first identifier associated with the first computing device. For example, the first computing device may provide identifying information, such as an associated Internet Protocol ("IP") address, a subscriber identifier, a device identifier, a combination thereof, and/or the like, to the control device. The control device may provide the identifying information to the database, which may resolve the identifying information and determine the first identifier associated with the first computing device. The first identifier may be a media access control ("MAC") address associated with the first computing device.

At step 810, the first computing device may receive the first identifier from the control device. The control device may store an association, or mapping, of the first identifier with a subscriber profile associated with the first identifier in the database. The subscriber profile may include a location identifier indicating the first location. The control device may store in the database an association, or mapping, of the first identifier with a date and/or a time, such as a date and/or time at which the first computing device executed the initialization process.

The first computing device may utilize sonic signaling, such as ultrasonic and/or near-ultrasonic communication techniques, to determine a presence of a person or object proximate thereto. As used herein, sonic signaling refers generally to transmission of information using ultrasonic and/or near-ultrasonic frequencies. One example of sonic signaling is a signal in which one or more frequencies correspond to various signal values (e.g. dual-tone multi-frequency ("DTMF") signaling). Other examples of sonic signaling include amplitude shift keying, frequency shift keying, and phase shift keying—any of which may be utilized by the first computing device to determine a presence of a person or object proximate thereto.

The first computing device may utilize sonic signaling, such as ultrasonic and/or near-ultrasonic communication techniques, to transmit information. For example, the first computing device may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device may emit the audio signal—or a portion thereof representing the encoded first identifier—at or above 20,000 Hz such that it may be inaudible to humans.

As a further example, the first computing device may use a microphone or other sound-receiving device to detect an audio sample of soundwaves within a proximity of the first computing device. From the audio sample, the first computing device may ascertain one or more frequencies of an acoustic spectrum on which the first computing device does not detect any sound (hereinafter, "one or more vacant frequencies") within the first location. The one or more vacant frequencies determined by the first computing device may include one or more ultrasonic and/or near-ultrasonic frequencies on which the first computing device does not detect any sound (e.g., no sounds within the one or more ultrasonic and/or near-ultrasonic frequencies are currently present).

At step 820, the first computing device may use the one or more ultrasonic and/or near-ultrasonic frequencies to encode the first identifier into an inaudible portion of an audio signal. The inaudible portion of the audio signal may be an ultrasonic and/or near-ultrasonic signal. The first identifier may include a character string (e.g., a series of numbers and/or letters) that may be digitally encoded as a series of bits and modulated in a binary format as the inaudible portion of the audio signal. For example, the first computing device may use multi-frequency signaling, such as spread spectrum communications or a multi-frequency carrier signaling, to designate a plurality of ultrasonic and/or near-ultrasonic frequencies. Each of the plurality of ultrasonic and/or near-ultrasonic frequencies may be separated by an interval. For each such frequency of the plurality of ultrasonic and/or near-ultrasonic frequencies, the first computing device may encode a "1" bit by emitting sound at the frequency or a "0" bit by not emitting sound at the frequency. As another example, the first computing device may encode a "0" bit by emitting sound at the frequency or a "1" by not emitting sound at the frequency. In this way, the one or more vacant frequencies may be used to encode the first identifier into the inaudible portion of the audio signal.

At step 830, the first computing device may emit the audio signal. The first computing device may emit the audio signal during presentation of content, such as a movie, a show, a commercial, a combination thereof, and/or the like, by causing one or more speakers (e.g., coupled to, or otherwise in communication with, the first computing device) to emit the audio signal (e.g., the inaudible portion may be emitted by the first computing device simultaneously with an audio signal of a content item). The first computing device may also emit the audio signal when content is not being presented. The audio signal may be received by a second computing device located within the first location. An audible portion of the audio signal may be heard/perceived by a person, such as a user of the second computing device, while the inaudible portion of the audio signal may not be heard/perceived by the person. The second computing device may periodically check for audio signals, such as the inaudible portion of the audio signal, using an application (e.g., a software application) that causes a microphone of the second computing device to detect (e.g., receive) some, or all, detectable audio/sound. The application may be a native application or a third-party application.

The second computing device may receive/detect the audio signal emitted by the one or more speakers. Once the audio signal is detected by the second computing device, the application may attempt to demodulate the inaudible portion of the audio signal using the reverse process of the modulating technique used by the first computing device when encoding the first identifier into the inaudible portion of the audio signal. For example, the second computing device may demodulate (e.g., decode) the inaudible portion of the audio signal using one or more of a dual-tone multi-frequency signaling process, a discrete Fourier transform, a combination thereof, and/or the like. The resulting demodulated inaudible portion of the audio signal may represent a binary string (e.g., a sequence of 0's and 1's). The second computing device may convert the binary string into the first identifier.

At step 840, the first computing device may receive an indication and/or a command from the control device. The indication and/or command may indicate that the second computing device is present at the first location. The indication and/or command may be sent to the first computing device by the control device in response to the second computing device sending an indication of presence to the control device. The indication of presence sent by the second computing device may include the first identifier along with a second identifier associated with the second computing device. The second identifier may be an identifier associated with the second computing device, such as an IP address, a MAC address, a device identifier, a combination thereof, and/or the like. The control device may store in the database an association, or mapping, of the second identifier with a date and/or a time, such as a date and time at which the second computing device sent the second identifier. The control device may determine the first identifier and the second identifier are associated with a subscriber profile based on the identifying information. The subscriber profile may be stored in the database, and it may include a location identifier indicating the first location. The control device may store in the database an association, or mapping, of the second identifier with the location identifier.

At step 850, the first computing device may cause an action to be taken. For example, the first computing device may cause presentation of a content item to be modified based on a user profile associated with the second computing device. The user profile may be stored at the first computing device, the second computing device, the control device, and/or the database. The user profile may indicate one or more preferences for content presentation, such as a level of volume, a closed captioning display preference, secondary content presentation preference (e.g., supplemental content and/or advertisements/commercials), ambient light settings, a combination thereof, and/or the like. Other preferences for content presentation may be provided by the user profile interface. As a further example, the control device may send a command to a third computing device. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device, the third computing device may cause presentation of the content item and/or one or more settings of the third computing device to be modified based on the user profile associated with the second computing device and/or the subscriber profile.

Figure 9:
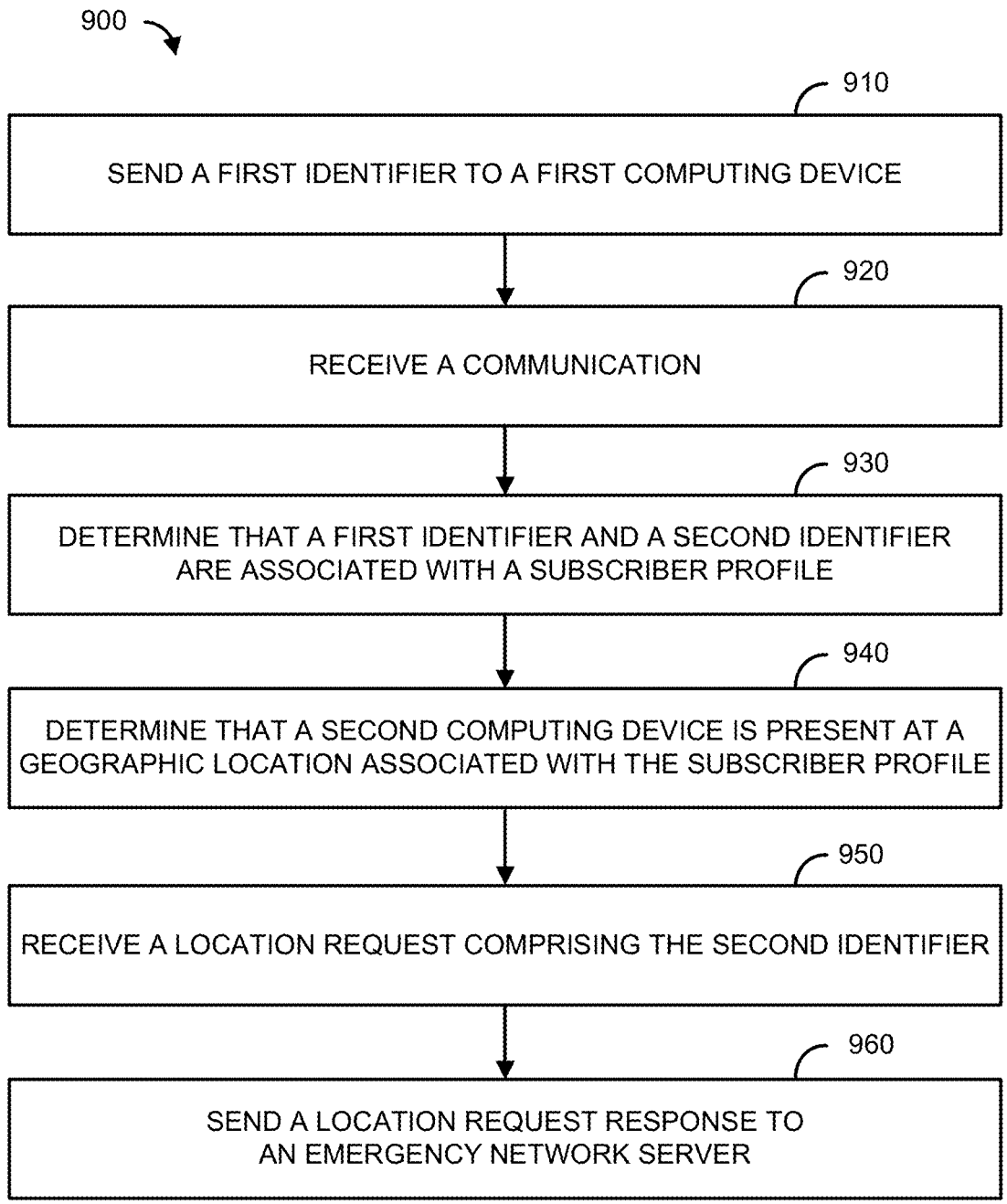
FIG. 9 shows a flowchart of an example method for presence detection.

FIG. 9 is a flowchart of an example method 900 for presence detection in accordance with the present description. The method 900 may be implemented using the system 100 of FIG. 1 and/or the system 200 of FIG. 2. For example, the method 900 may be implemented by the central location 101, the edge device 129, or the control device 206. At step 910, a control device may send a first identifier to a first computing device. The control device may be a cache device or a headend of a content distribution network. The control device may send the first identifier in response to receiving an indication of an initialization process sent by the first computing device to the control device. The initialization process may be a startup procedure(s) executed during a booting phase of the first computing device and/or when the first computing device connects to a network. The first identifier may be a media access control ("MAC") address associated with the first computing device. The control device may associate, or map, the first identifier with a subscriber profile associated with the first identifier. The subscriber profile may include a location identifier indicating a geographic location, such as an address (e.g., number, street, city, state, and country), at which the first computing device is located. The control device may associate, or map, the first identifier with a date and/or a time, such as a date and/or time at which the first computing device executed the initialization process.

The first computing device may utilize sonic signaling, such as ultrasonic and/or near-ultrasonic communication techniques, to transmit information. For example, the first computing device may use one or more ultrasonic and/or near-ultrasonic frequencies to encode the first identifier into an audio signal using one or more a dual-tone multi-frequency signaling process, a discrete Fourier transform, a combination thereof, and/or the like. The audio signal may be an ultrasonic and/or near-ultrasonic signal. The average person can perceive sound between approximately 20 and 20,000 Hz. The first computing device may emit the audio signal—or a portion thereof representing the encoded first identifier—at or above 20,000 Hz such that it may be inaudible to humans.

As a further example, the first computing device may use a microphone or other sound-receiving device to detect an audio sample of soundwaves proximate to the first computing device. From the audio sample, the first computing device may ascertain one or more frequencies of an acoustic spectrum on which the first computing device does not detect any sound (hereinafter, "one or more vacant frequencies"). The one or more vacant frequencies may include one or more ultrasonic and/or near-ultrasonic frequencies. The first computing device may use the one or more ultrasonic and/or near-ultrasonic frequencies to encode the first identifier into an inaudible portion of an audio signal. The audio signal may be an ultrasonic and/or near-ultrasonic signal. The first computing device may emit the audio signal—including the inaudible portion containing the encoded first identifier—via one or more speakers during presentation of a content item, such as a movie, a show, a commercial, a combination thereof, and/or the like (e.g., the inaudible portion may be emitted by the first computing device simultaneously with an audio signal of a content item).

Additionally, or in the alternative, the first computing device may emit the inaudible portion containing the encoded first identifier when content is not being presented. For example, the first computing device may emit an audio signal containing only the inaudible portion when content is not being presented. The audio signal may be an ultrasonic and/or near-ultrasonic signal.

A second computing device, such as a user device, a mobile device, or the like, may detect soundwaves of the audio signal via a microphone. For example, the second computing device may detect soundwaves of the audio signal emitted at the one or more ultrasonic and/or near-ultrasonic frequencies that correspond to the inaudible portion of the audio signal. The second computing device may decode the first identifier from the inaudible portion of the audio signal using one or more a dual-tone multi-frequency signaling process, a discrete Fourier transform, a combination thereof, and/or the like. At step 920, a communication may be received by the control device from the second computing device. For example, the communication may be an indication of presence. The communication may include the first identifier along with a second identifier associated with the second computing device. The second identifier may be a MAC address associated with the second computing device.

The control device may associate, or map, the second identifier with a date and/or a time, such as a date and time at which the second computing device sent the second identifier. At step 930, the control device may determine that the first identifier and the second identifier are associated with the subscriber profile, which includes the location identifier. The control device may associate, or map, the second identifier with the location identifier, which may indicate a geographic location (e.g., based on the first identifier and the second identifier being associated with the subscriber profile).

At step 940, the control device may determine that the second computing device is present at the geographic location associated with the location identifier. The control device may determine that the second computing device is present at the geographic location based on the subscriber profile and the indication of presence. The control device may send an indication to the first computing device that the second computing device is present at the geographic location. The first computing device, after receiving the indication, may cause presentation of a content item to be modified based on a user profile associated with the second computing device. For example, the user profile may indicate one or more preferences for content presentation, such as a level of volume, closed captioning display, secondary content presentation (e.g., supplemental content and/or advertisements/commercials), ambient light settings, a combination thereof, and/or the like. As a further example, the control device may send a command to a third computing device. The command sent to the third computing device may be associated with the one or more user preferences present within the subscriber profile, such as lighting preferences, video and/or audio presentation settings, a combination thereof, and/or the like. The third computing device may be a smart appliance, a smart lighting fixture/bulb, a smart audio and/or video presentation device, a thermostat, a combination thereof and/or the like. After receiving the command from the control device, the third computing device may cause presentation of the content item and/or one or more settings of the third computing device to be modified based on the user profile associated with the second computing device and/or the subscriber profile.

An emergency network server, such as a server associated with an emergency dispatching service, may receive an emergency communication, such as an e-911 telephone call, that includes, among other things, the second identifier. The emergency network server may send a location request to the control device in response to receiving the emergency communication. At step 950, the control device may receive the location request from the emergency network server. The location request may include the second identifier and a date and/or time at which the emergency communication was received. The control device may determine the second computing device is located at the geographic location based on the association, or mapping, of the second identifier to the geographic location and the date and/or time at which the second computing device sent the second identifier to the control device. At step 960, the control device may send a location request response to the emergency network server. The location request response may indicate the location identifier and the date and/or time at which the second computing device sent the second identifier to the control device.

Figure 10:
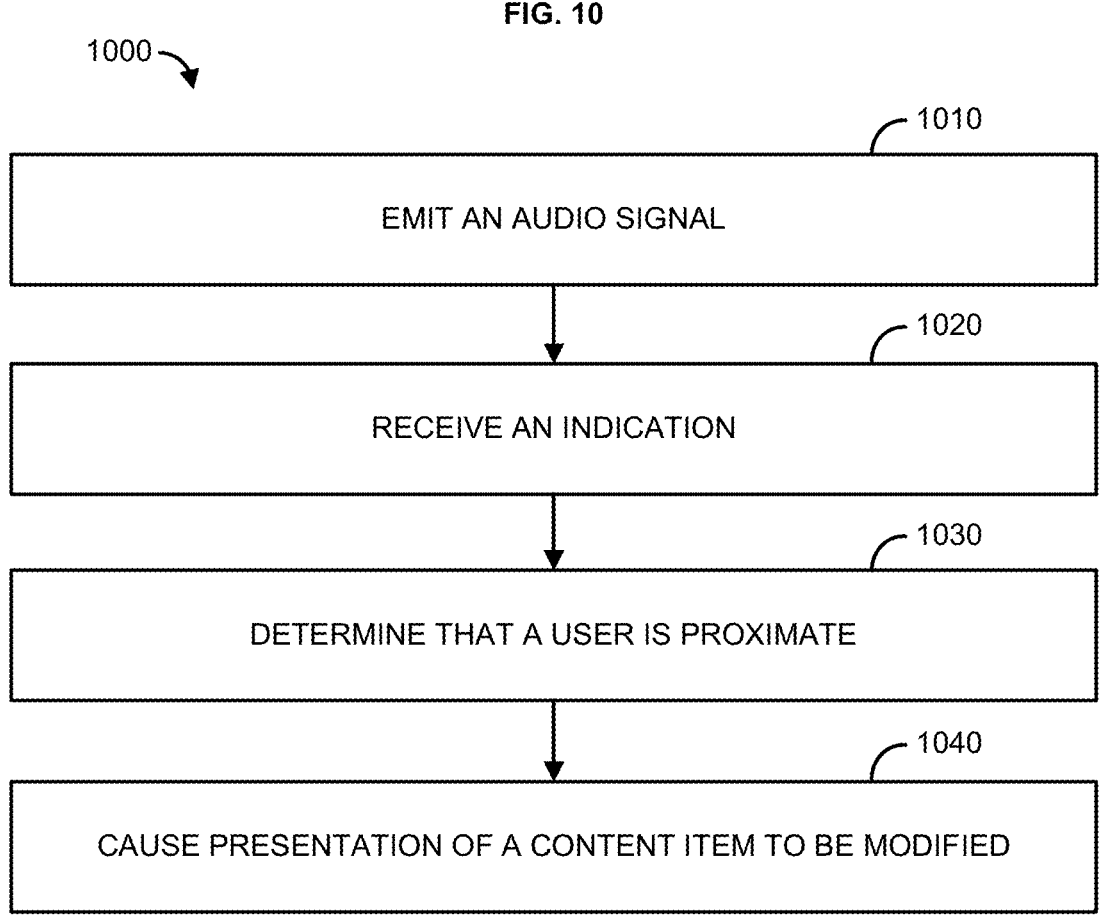
FIG. 10 shows a flowchart of an example method for presence detection.

FIG. 10 is a flowchart of an example method 1000 for presence detection in accordance with the present description. The method 1000 may be implemented using the system 100 of FIG. 1 and/or the system 200 of FIG. 2. For example, the method 1000 may be implemented by a first computing device, such as the media device 120, the display 121, or the first computing device 202.

At step 1010, the first computing device may emit an audio signal at a first frequency. The first frequency may be an ultrasonic and/or near-ultrasonic frequency (e.g., at or above 20,000 Hz). In this way, the first computing device may emit the audio signal at the first frequency such that it may be inaudible to persons nearby the first computing device. The first computing device may emit the audio signal at the first frequency during presentation of content (e.g., the audio signal at the first frequency may be emitted by the first computing device simultaneously with an audio signal of a content item). Additionally, or in the alternative, the first computing device may emit the audio signal at the first frequency when content is not being presented.

A second computing device may be proximate to the first computing device while the audio signal at the first frequency is being emitted by the first computing device. The second computing device may be user device, such as the mobile device 124. The second computing device may use a microphone, or similar component, to detect soundwaves of the audio signal at the first frequency. The second computing device may determine the first frequency using the detected soundwaves. The second computing device may be configured to associate any detected soundwaves at the first frequency with the first computing device (e.g., to identify the first computing device), and the second computing device may send an indication when detecting soundwaves at the first frequency. As another example, the second computing device may be configured to provide the indication when receiving soundwaves that are determined to be within a range of frequencies, and the first frequency may be within the range of frequencies. The second computing device may send the indication along with an identifier associated with the second computing device. The identifier may be a MAC address associated with the second computing device.

In some example configurations, the second computing device may send the indication to a control device. The control device may be a separate entity, or it may be resident at the first computing device. For example, the control device may be a component, module, or any other element within the first computing device, in which case the second computing device may send the indication to the first computing device. Further, the control device may be a separate entity that is located proximate to the first computing device (e.g., at the geographic location). Other configurations of the control device are possible.

At step 1020, the first computing device may receive the indication from the second computing device. The first computing device may associate, or map, the identifier with a date and/or a time, such as a date and time at which the second computing device sent the indication and the identifier. At step 1030, the first computing device may determine that a user of the second computing device is proximate to the first computing device. For example, the first computing device may determine that the identifier is associated with a subscriber profile. The subscriber profile may include a location identifier indicating a user location, such as a geographic location, a location within a structure/building, an area of interest, a combination thereof and/or the like. The first computing device may associate, or map, the identifier with the location identifier indicating the geographic location of the first computing device (e.g., based on the identifier being associated with the subscriber profile). The first computing device may determine that the user associated with the subscriber profile is proximate to the first computing device based on receiving the indication from the second computing device.

An action(s) may be taken in response to receiving the indication from the second computing device. For example, the first computing device may determine that the second computing device is present at the geographic location based on receiving the indication from the second computing device that the audio signal at the first frequency was detected. The action(s) may be associated with one or more user preferences present within the subscriber profile, such as lighting preferences, video and/or audio presentation settings, a combination thereof, and/or the like. For example, the action(s) may be associated with modifying output of a content item(s).

At step 1040, the first computing device may cause presentation of a content item to be modified based on the user profile associated with the second computing device and/or the subscriber profile. For example, the user profile may indicate one or more preferences for content presentation, such as a level of volume, closed captioning display, secondary content presentation (e.g., supplemental content and/or advertisements/commercials), ambient light settings, a combination thereof, and/or the like.

As a further example, the first computing device may send a command to a third computing device. The third computing device may be a smart appliance, a smart lighting fixture/bulb, a smart audio and/or video presentation device, a thermostat, a combination thereof and/or the like. The command sent to the third computing device may be associated with the one or more user preferences present within the subscriber profile, such as lighting preferences, video and/or audio presentation settings, a combination thereof, and/or the like. In response to receiving the command from the first computing device, the third computing device may cause presentation of the content item and/or one or more settings of the third computing device to be modified based on the user profile associated with the second computing device and/or the subscriber profile.

Figure 11:
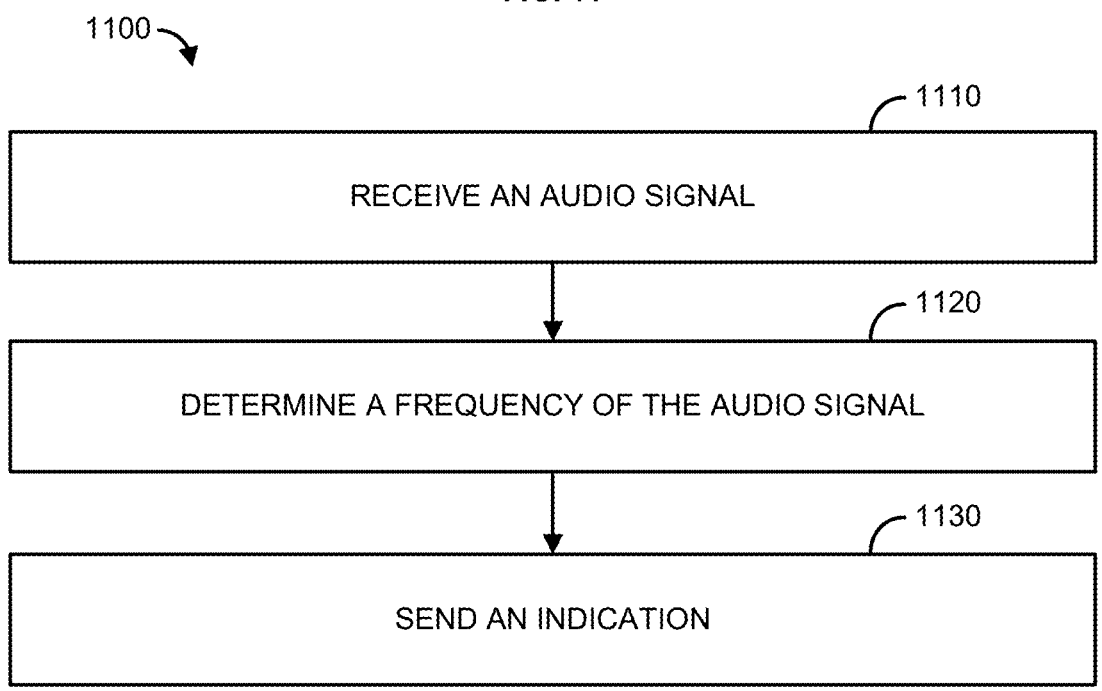
FIG. 11 shows a flowchart of an example method for presence detection.

FIG. 11 is a flowchart of an example method 1100 for presence detection in accordance with the present description. The method 1100 may be implemented using the system 100 of FIG. 1 and/or the system 200 of FIG. 2. For example, the method 1100 may be implemented by a first computing device, such as the mobile device 124, the display 121, or the second computing device 208. A second computing device may emit an audio signal at a first frequency. The first frequency may be an ultrasonic and/or near-ultrasonic frequency (e.g., at or above 20,000 Hz). In this way, the second computing device may emit the audio signal at the first frequency such that it may be inaudible to persons nearby the second computing device. The second computing device may emit the audio signal at the first frequency during presentation of content (e.g., the audio signal at the first frequency may be emitted by the second computing device simultaneously with an audio signal of a content item). Additionally, or in the alternative, the second computing device may emit the audio signal at the first frequency when content is not being presented.

The first computing device may be proximate to the second computing device while the audio signal at the first frequency is being emitted by the second computing device. At step 1110, the first computing device may receive (e.g., detect) the audio signal at the first frequency. For example, the first computing device may use a microphone, or similar component, to detect soundwaves of the audio signal at the first frequency. At step 1120, the first computing device may determine a frequency of the received/detected audio signal. For example, the first computing device may determine the audio signal is at the first frequency using the detected soundwaves. The first computing device may be configured to associate any detected soundwaves at the first frequency with the second computing device (e.g., to identify the second computing device). At step 1130, the first computing device may send an indication to the second computing device. For example, the first computing device may send the indication in response to detecting soundwaves at the first frequency. As another example, the first computing device may be configured to provide the indication when receiving soundwaves that are determined to be within a range of frequencies, and the first frequency may be within the range of frequencies. The first computing device may send the indication along with an identifier associated with the first computing device. For example, the identifier may be a MAC address associated with the first computing device.

In some example configurations, the first computing device may send the indication to a control device. The control device may be a separate entity, or it may be resident at the second computing device. For example, the control device may be a component, module, or any other element within the second computing device, in which case the first computing device may send the indication to the second computing device. Further, the control device may be a separate entity that is located proximate to the second computing device (e.g., at the geographic location). Other configurations of the control device are possible.

The second computing device may receive the indication from the first computing device. The second computing device may associate, or map, the identifier with a date and/or a time, such as a date and time at which the first computing device sent the indication and the identifier. The second computing device may determine that a user of the first computing device is proximate to the second computing device. For example, the second computing device may determine that the identifier is associated with a subscriber profile. The subscriber profile may include a location identifier indicating a user location, such as a geographic location, a location within a structure/building, an area of interest, a combination thereof and/or the like. The second computing device may associate, or map, the identifier with the location identifier indicating the geographic location of the second computing device (e.g., based on the identifier being associated with the subscriber profile). The second computing device may determine that the user associated with the subscriber profile is proximate to the second computing device based on receiving the indication from the first computing device.

An action(s) may be taken by the second computing device in response to receiving the indication from the first computing device. For example, the second computing device may determine that the first computing device is present at the geographic location based on receiving the indication from the first computing device that the audio signal at the first frequency was detected. The action(s) may be associated with one or more user preferences present within the subscriber profile, such as lighting preferences, video and/or audio presentation settings, a combination thereof, and/or the like. For example, the action(s) may be associated with modifying output of a content item(s).

The second computing device may cause presentation of a content item to be modified based on the user profile associated with the first computing device and/or the subscriber profile. For example, the user profile may indicate one or more preferences for content presentation, such as a level of volume, closed captioning display, secondary content presentation (e.g., supplemental content and/or advertisements/commercials), ambient light settings, a combination thereof, and/or the like.

As a further example, the second computing device may send a command to a third computing device. The third computing device may be a smart appliance, a smart lighting fixture/bulb, a smart audio and/or video presentation device, a thermostat, a combination thereof and/or the like. The command sent to the third computing device may be associated with the one or more user preferences present within the subscriber profile, such as lighting preferences, video and/or audio presentation settings, a combination thereof, and/or the like. In response to receiving the command from the second computing device, the third computing device may cause presentation of the content item and/or one or more settings of the third computing device to be modified based on the user profile associated with the first computing device and/or the subscriber profile.

Figure 12:
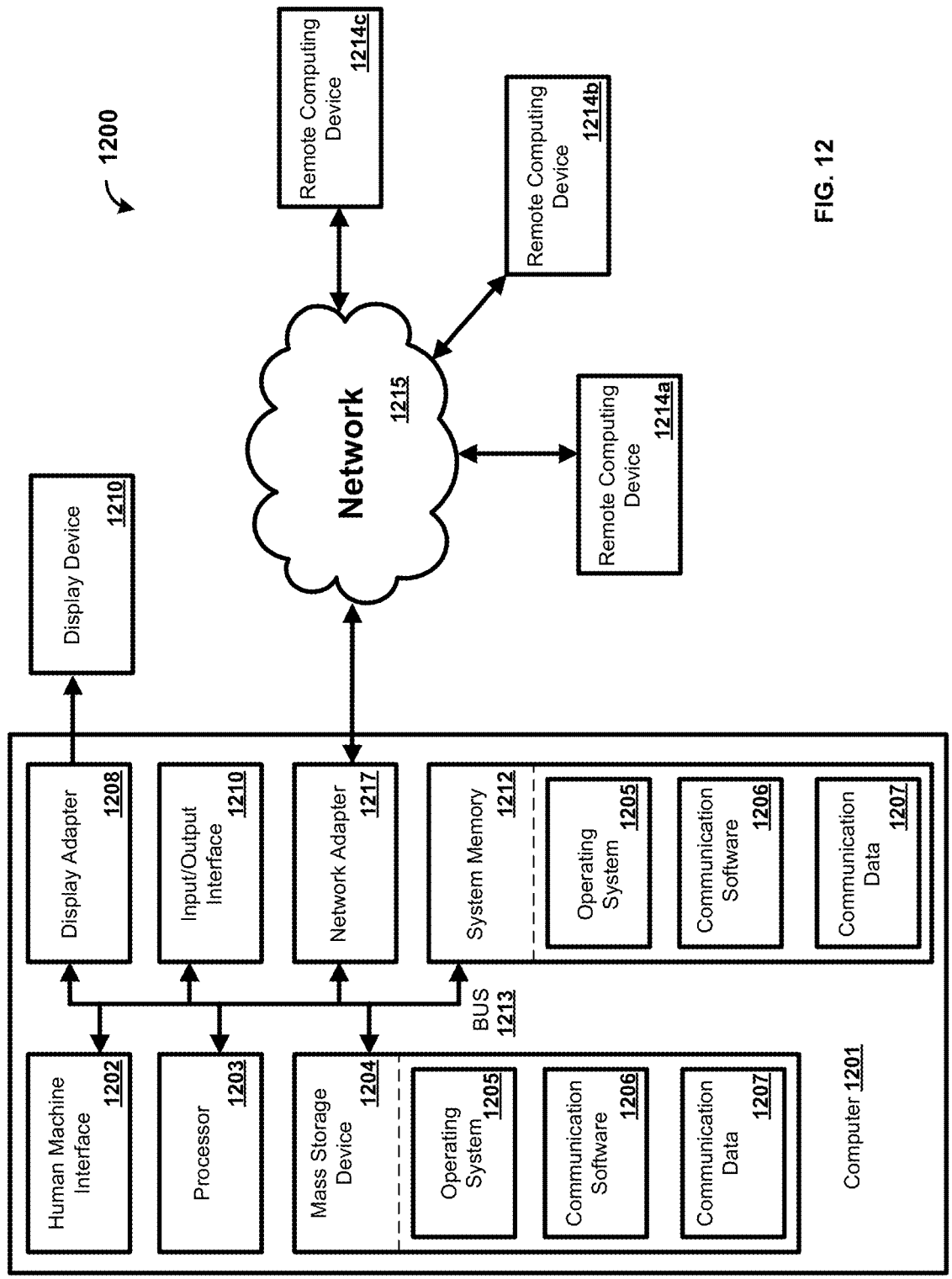
FIG. 12 shows a block diagram of an example computing device.

FIG. 12 shows a system 1200 for presence detection in accordance with the present description. Each of the devices/components shown in FIGS. 1 and 2 may be a computer 1201 as shown in FIG. 12. The computer 1201 may include one or more processors 1203, a system memory 1212, and a bus 1213 that couples various system components including the one or more processors 1203 to the system memory 1212. In the case of multiple processors 1203, the computer 1201 may utilize parallel computing. The bus 1213 is one or more of several possible types of bus structures, including a memory bus or memory controller, a peripheral bus, an accelerated graphics port, or local bus using any of a variety of bus architectures.

The computer 1201 may operate on and/or comprise a variety of computer readable media (e.g., non-transitory media). The readable media may be any available media that is accessible by the computer 1201 and may include both volatile and non-volatile media, removable and non-removable media. The system memory 1212 has computer readable media in the form of volatile memory, such as random access memory (RAM), and/or non-volatile memory, such as read only memory (ROM). The system memory 1212 may store data such as the communication data 1207 and/or program modules such as the operating system 1205 and the communication software 1206 that are accessible to and/or are operated on by the one or more processors 1203.

The computer 1201 may also have other removable/non-removable, volatile/non-volatile computer storage media. FIG. 12 shows the mass storage device 1204 which may provide non-volatile storage of computer code, computer readable instructions, data structures, program modules, and other data for the computer 1201. The mass storage device 1204 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like.

Any number of program modules may be stored on the mass storage device 1204, such as the operating system 1205 and the communication software 1206. Each of the operating system 1205 and the communication software 1206 (e.g., or some combination thereof) may have elements of the program modules and the communication software 1206. The communication data 1207 may also be stored on the mass storage device 1204. The communication data 1207 may be stored in any of one or more databases known in the art. Such databases may be DB2®, Microsoft® Access, Microsoft® SQL Server, Oracle®, mySQL, PostgreSQL, and the like. The databases may be centralized or distributed across locations within the network 1215.

A user may enter commands and information into the computer 1201 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1203 via a human machine interface 1202 that is coupled to the bus 1213, but may be connected by other interface and bus structures, such as a parallel port, game port, an IEEE 13104 Port (also known as a Firewire port), a serial port, network adapter 1217, and/or a universal serial bus (USB).

The display device 1210 may also be connected to the bus 1213 via an interface, such as the display adapter 1208. It is contemplated that the computer 1201 may have more than one display adapter 1208 and the computer 1201 may have more than one display device 1210. The display device 1210 may be a monitor, an LCD (Liquid Crystal Display), light emitting diode (LED) display, television, smart lens, smart glass, and/or a projector. In addition to the display device 1210, other output peripheral devices may be components such as speakers (not shown) and a printer (not shown) which may be connected to the computer 1201 via the Input/Output Interface 1210. Any step and/or result of the methods may be output (or caused to be output) in any form to an output device. Such output may be any form of visual representation, including, but not limited to, textual, graphical, animation, audio, tactile, and the like. The display device 1210 and computer 1201 may be part of one device, or separate devices.

The computer 1201 may operate in a networked environment using logical connections to one or more remote computing devices 1214a,b,c. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 1201 and a remote computing device 1214a,b,c may be made via a network 1215, such as a local area network (LAN) and/or a general wide area network (WAN). Such network connections may be through the network adapter 1217. The network adapter 1217 may be implemented in both wired and wireless environments. Such networking environments are conventional and commonplace in dwellings, offices, enterprise-wide computer networks, intranets, and the Internet.

Application programs and other executable program components such as the operating system 1205 are shown herein as discrete blocks, although it is recognized that such programs and components reside at various times in different storage components of the computing device 1201, and are executed by the one or more processors 1203 of the computer. An implementation of the communication software 1206 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   causing, by a first computing device, one or more speakers to emit an inaudible audio signal configured to determine one or more other devices proximate to the first computing device;
   receiving, based on the inaudible audio signal, an indication that a second computing device received the inaudible audio signal; and
   determining, by the first computing device and based on receiving the indication that the second computing device received the inaudible audio signal, the second computing device is proximate to a geographic location of the first computing device.

2. The method of claim 1, wherein the first computing device comprises a set top box, a smart speaker, or an entertainment system.

3. The method of claim 1, further comprising encoding a first identifier associated with the first computing device into the inaudible audio signal.

4. The method of claim 1, further comprising determining a vacant acoustic spectrum proximate to the first computing device, wherein the inaudible audio signal is emitted at one or more frequencies within the vacant acoustic spectrum.

5. The method of claim 1, wherein the inaudible audio signal is emitted by the one or more speakers simultaneously with an audible audio signal of a content item.

6. The method of claim 1, further comprising:
receiving an audio sample of sound; and
determining, based on the audio sample, a vacant acoustic spectrum, wherein the inaudible audio signal is emitted at one or more frequencies within the vacant acoustic spectrum.

7. The method of claim 1, further comprising causing, based on determining the second computing device is proximate to the geographic location of the first computing device, one or more of a modification of a presentation of a content item, a modification of an audio level for the content item, presentation of secondary content associated with the content item, or a modification of ambient light settings.

8. An apparatus comprising:
one or more processors; and
memory storing processor-executable instructions that, when executed by the one or more processors, cause the apparatus to:
cause one or more speakers to emit an inaudible audio signal configured to determine one or more other devices proximate to the apparatus;
receive, based on the inaudible audio signal, an indication that a second computing device received the inaudible audio signal; and
determine, based on receiving the indication that the second computing device received the inaudible audio signal, the second computing device is proximate to a geographic location of the apparatus.

9. The apparatus of claim 8, wherein the apparatus comprises a set top box, a smart speaker, or an entertainment system.

10. The apparatus of claim 8, wherein the processor-executable instructions, when executed by the one or more processors, further cause the apparatus to encode a first identifier associated with the apparatus into the inaudible audio signal.

11. The apparatus of claim 8, wherein the processor-executable instructions, when executed by the one or more processors, further cause the apparatus to determine a vacant acoustic spectrum proximate to the apparatus, wherein the inaudible audio signal is emitted at one or more frequencies within the vacant acoustic spectrum.

12. The apparatus of claim 8, wherein the inaudible audio signal is emitted by the one or more speakers simultaneously with an audible audio signal of a content item.

13. The apparatus of claim 8, wherein the processor-executable instructions, when executed by the one or more processors, further cause the apparatus to:
receive an audio sample of sound; and
determine, based on the audio sample, a vacant acoustic spectrum, wherein the inaudible audio signal is emitted at one or more frequencies within the vacant acoustic spectrum.

14. The apparatus of claim 8, wherein the processor-executable instructions, when executed by the one or more processors, further cause the apparatus to cause, based on determining the second computing device is proximate to the geographic location of the apparatus, one or more of a modification of a presentation of a content item, a modification of an audio level for the content item, presentation of secondary content associated with the content item, or a modification of ambient light settings.

15. One or more non-transitory computer-readable media storing processor-executable instructions that, when executed by at least one processor, cause the at least one processor to:
cause one or more speakers to emit an inaudible audio signal configured to determine one or more other devices proximate to a first computing device;
receive, based on the inaudible audio signal, an indication that a second computing device received the inaudible audio signal; and
determine, based on receiving the indication that the second computing device received the inaudible audio signal, the second computing device is proximate to a geographic location of the first computing device.

16. The one or more non-transitory computer-readable media of claim 15, wherein the first computing device comprises a set top box, a smart speaker, or an entertainment system.

17. The one or more non-transitory computer-readable media of claim 15, wherein the processor-executable instructions, when executed by the at least one processor, further cause the at least one processor to encode a first identifier associated with the first computing device into the inaudible audio signal.

18. The one or more non-transitory computer-readable media of claim 15, wherein the processor-executable instructions, when executed by the at least one processor, further cause the at least one processor to determine a vacant acoustic spectrum proximate to the first computing device, wherein the inaudible audio signal is emitted at one or more frequencies within the vacant acoustic spectrum.

19. The one or more non-transitory computer-readable media of claim 15, wherein the inaudible audio signal is emitted by the one or more speakers simultaneously with an audible audio signal of a content item.

20. The one or more non-transitory computer-readable media of claim 15, wherein the processor-executable instructions, when executed by the at least one processor, further cause the at least one processor to:
receive an audio sample of sound; and
determine, based on the audio sample, a vacant acoustic spectrum, wherein the inaudible audio signal is emitted at one or more frequencies within the vacant acoustic spectrum.

21. The one or more non-transitory computer-readable media of claim 15, wherein the processor-executable instructions, when executed by the at least one processor, further cause the at least one processor to cause, based on determining the second computing device is proximate to the geographic location of the first computing device, one or more of a modification of a presentation of a content item, a modification of an audio level for the content item, presentation of secondary content associated with the content item, or a modification of ambient light settings.

22. A system comprising:
a first computing device configured to:
cause one or more speakers to emit an inaudible audio signal configured to determine one or more other devices proximate to the first computing device;
receive, based on the inaudible audio signal, an indication that a second computing device received the inaudible audio signal; and determine, based on receiving the indication that the second computing device received the inaudible audio signal, the second computing device is proximate to a geographic location of the first computing device; and the second computing device configured to:

receive the inaudible audio signal.

23. The system of claim 22, wherein the first computing device comprises a set top box, a smart speaker, or an entertainment system.

24. The system of claim 22, wherein the first computing device is further configured to encode a first identifier associated with the first computing device into the inaudible audio signal.

25. The system of claim 22, wherein the first computing device is further configured to determine a vacant acoustic spectrum proximate to the first computing device, wherein the inaudible audio signal is emitted at one or more frequencies within the vacant acoustic spectrum.

26. The system of claim 22, wherein the inaudible audio signal is emitted by the one or more speakers simultaneously with an audible audio signal of a content item.

27. The system of claim 22, wherein the first computing device is further configured to:

receive an audio sample of sound; and determine, based on the audio sample, a vacant acoustic spectrum, wherein the inaudible audio signal is emitted at one or more frequencies within the vacant acoustic spectrum.

28. The system of claim 22, wherein the first computing device is further configured to cause, based on determining the second computing device is proximate to the geographic location of the first computing device, one or more of a modification of a presentation of a content item, a modification of an audio level for the content item, presentation of secondary content associated with the content item, or a modification of ambient light settings.

* * * * *